US011580127B1

(12) United States Patent
Newman

(10) Patent No.: US 11,580,127 B1
(45) Date of Patent: Feb. 14, 2023

(54) USER INTERFACES FOR DATABASE VISUALIZATIONS

(71) Applicant: Wells Fargo Bank, N.A., San Francisco, CA (US)

(72) Inventor: David Newman, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 278 days.

(21) Appl. No.: 16/230,879

(22) Filed: Dec. 21, 2018

(51) Int. Cl.
*G06F 16/248* (2019.01)
*G06F 16/25* (2019.01)
*G06F 16/901* (2019.01)
*G06F 40/30* (2020.01)
*G06F 3/0482* (2013.01)

(52) U.S. Cl.
CPC .......... *G06F 16/248* (2019.01); *G06F 16/252* (2019.01); *G06F 16/9024* (2019.01); *G06F 40/30* (2020.01); *G06F 3/0482* (2013.01)

(58) Field of Classification Search
CPC .................. G06F 16/248; G06F 16/252; G06F 16/9024; G06F 40/30; G06F 3/0482; G06K 9/2224
USPC ....................................................... 707/722
See application file for complete search history.

(56) References Cited

U.S. PATENT DOCUMENTS

| 7,630,978 | B2 | 12/2009 | Li et al. |
| 7,840,577 | B2 | 11/2010 | Ortega et al. |
| 9,189,742 | B2 | 11/2015 | London |
| 9,535,902 | B1 | 1/2017 | Michalak et al. |
| 9,766,983 | B2 | 9/2017 | Reddy et al. |
| 9,779,147 | B1 * | 10/2017 | Sherman ............... G06F 16/248 |

(Continued)

FOREIGN PATENT DOCUMENTS

| WO | WO-2019172849 A1 | 9/2019 |
| WO | WO-2020162884 A1 | 8/2020 |

OTHER PUBLICATIONS

Rácz G., Gombos G., Kiss A. (2014) Visualization of Semantic Data Based on Selected Predicates. In: Nguyen N. (eds) Transactions on Computational Collective Intelligence XIV. Lecture Notes in Computer Science, vol. 8615. Springer, Berlin, Heidelberg, https://doi.org/10.1007/978-3-662-44509-9_9 (Year: 2014).*

(Continued)

*Primary Examiner* — Robert W Beausoliel, Jr.
*Assistant Examiner* — Arthur Ganger
(74) *Attorney, Agent, or Firm* — Schwegman Lundberg & Woessner, P.A.

(57) ABSTRACT

A method may include presenting a user interface on a display device of a computing device, the user interface including: a search query input element; a plurality of graph type options; a graph level selection element; and a graph presentation area; receiving a search query inputted into the search query input element, the search query identifying a concept object in an ontology; retrieving data associated with the concept object from a graph database based on selections made in the graph type options and the graph level selection element, the data including a set of result objects related to the concept object; and rendering a hierarchical graph in the graph presentation area, the hierarchical graph illustrating the set of result objects and the concept object as interactive nodes.

8 Claims, 12 Drawing Sheets

(56) References Cited

U.S. PATENT DOCUMENTS

| | | |
|---|---|---|
| 10,348,658 B2 | 7/2019 | Rodriguez et al. |
| 10,628,490 B2 | 4/2020 | Yakout et al. |
| 10,740,541 B2 | 8/2020 | Zambre et al. |
| 10,769,142 B2 | 9/2020 | Chen |
| 10,936,969 B2 | 3/2021 | Patel et al. |
| 10,951,763 B2 | 3/2021 | Copeland |
| 2016/0027197 A1* | 1/2016 | Beckett ................. G06T 11/206 345/440 |
| 2018/0129369 A1* | 5/2018 | Kim ...................... G06F 16/254 |
| 2018/0300409 A9 | 10/2018 | Dingwall et al. |
| 2019/0179917 A1 | 6/2019 | Agrawal et al. |
| 2020/0117857 A1 | 4/2020 | Gnanasambandam et al. |
| 2020/0151392 A1 | 5/2020 | Crabtree et al. |
| 2020/0242140 A1 | 7/2020 | Xu et al. |
| 2020/0272662 A1 | 8/2020 | Markovic et al. |
| 2020/0322361 A1 | 10/2020 | Ravindra et al. |
| 2020/0349324 A1* | 11/2020 | Ostby ................... G06F 40/279 |
| 2020/0401593 A1 | 12/2020 | Panuganty et al. |

OTHER PUBLICATIONS

Kasyanov et al. "Information Visualization on the Base of Hierarchical Graphs" Published 2015. Accessed Jun. 18, 2022 from <http://im-pmf.weebly.com/uploads/5/8/9/8/58988609/kasyanov-kasyanova-bilten-1-2015.pdf> (Year: 2015).*

* cited by examiner

US 11,580,127 B1

USER INTERFACES FOR DATABASE VISUALIZATIONS

BACKGROUND

An ontology may be a taxonomy of concepts for a given field—different fields may use different ontologies. The ontology may identify types (e.g., concept objects), properties, and interrelationships between the objects. In some examples, the definition of an ontology is described and stored as a schema at a network-accessible uniform resource identifier (URI).

A graph database may be used for storing a representation of an ontology. Nodes of the database may represent objects, edges may connect the nodes to indicate a relationship, and properties may indicate information about the edges and nodes. A triplestore (sometimes referred to a resource description framework (RDF) store) is a type of graph database often used for semantic data that conforms to the subject-predicate (or property)-object format.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
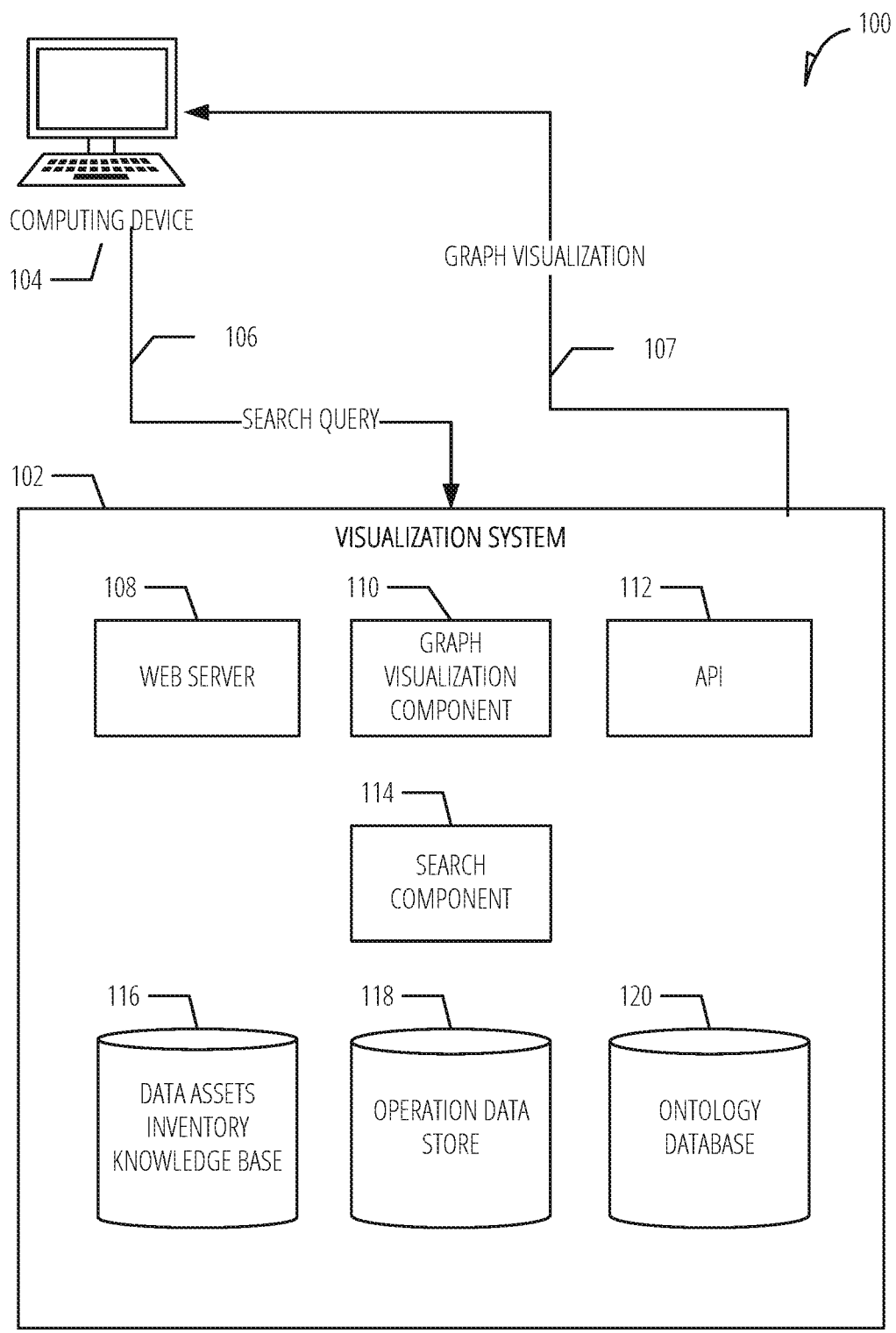
FIG. 1 is a diagram illustrating a schematic representation of components to generate graph visualizations, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. User interfaces may be provided for an end-user or administrator to edit the variable values in some instances.

As indicated in the Background, an ontology may be used as a taxonomy for a given field (e.g., medical or financial). As a simple example, consider a schema for a Person object. The schema may include a number of entries that define the properties (sometimes referred to as relationships, slot-value types) of a Person object such as "given name," "height," "weight," etc., and the properties may also have expected types. Thus, the "height" property may have a value-type of a number whereas "given name" has a string value type. The expected type of an object may be another object. For example, a property of "knows" may have an expected type of Person. Accordingly, the data string "Alice knows Bob" can be thought of as two Person objects with the Alice having the "knows" property.

Another way to consider ontologies is using a "Subject, Predicate, Object" (S-P-O) format. Using the example of "Alice knows Bob," Alice is the subject, the predicate is "knows," and the object is "Bob." With reference back to the example Person schema, the predicate is the property in the schema and the expected type is the object. Accordingly, a schema may semantically define valid relationships between multiple objects.

At a basic form, an ontology may be structured as a directed acyclic graph and stored in a graph database. Each node in the directed acyclic graph may represent a concept object in the ontology. A concept object may have a "is a" direct property relationship to one or more other concept objects that are represented as vertices in the directed acyclic graph. If concept object B "is a" concept object A, then concept object B may be considered a subclass of concept object B. Similarly, concept object A may be a superclass concept object of concept object B. The relationships and concept objects may be stored in a graph database. Properties from a superclass of a concept object may be inherited to the concept object.

A concept object may also be semantically related to other concept objects or attributes. Unlike direct "is a" relationship, semantically related objects do not automatically inherit properties from their semantic links. For example, a Person object may have a property of "works for" a Company object, but the Person object may not necessarily inherit properties of the Company object.

In some examples, a more specific type of a graph database, known as a triplestore (also sometimes referred to a resource description framework (RDF) database)), is used to store the semantic data (e.g., relationships) for the ontology. Triples conforming to the S-P-O format may be stored in the triplestore and be expressed using the World Wide Web Consortium's (W3C) RDF protocol in various examples. The W3C also defines a Web ontology Language (OWL) semantic web language. RDF/OWL conforming ontologies may be used to access and retrieve ontology definitions and relationships from disparate linked ontologies. For example, each of the S, P, and O of the triple may be stored as a Universal Resource Identifier that identifies an RDF file. Accordingly, one may reference the URI of a first ontology as the object of an S-P-O triple while using a URI of a second ontology for the 'S'.

Visualizing ontologies and navigating visualization may be a difficult task. For example, there may be hundreds or thousands of related concept objects/triples in a graph database. Given the inherent physical limitations of display devices, it may not be possible to display all of the relationships. Accordingly, new user interfaces may be generated with controls specific to ontology data.

In addition to a graph database storing ontological data, an organization will often have relational databases that store operation data. A problem may arise in visualizing relationships between the operational data and the ontology data at least because different database management system—and corresponding query languages—may be used for graph database and the relational databases. Accordingly, new user interfaces may be generated that ease switching between relational and graph database views as well as merging data between different database systems.

FIG. 1 is a diagram 100 illustrating a schematic representation of components to generate graph visualizations, according to various examples. Diagram 100 includes visualization system 102, which includes web server 108, graph visualization component 110, API 112, search component 114, data assets inventory knowledge base 116, operation data store 118, and ontology database 120. Diagram 100 also illustrates computing device 104 transmitted search query 106 to visualization system 102 and receiving graph visualization 107 in response.

Figure 10:
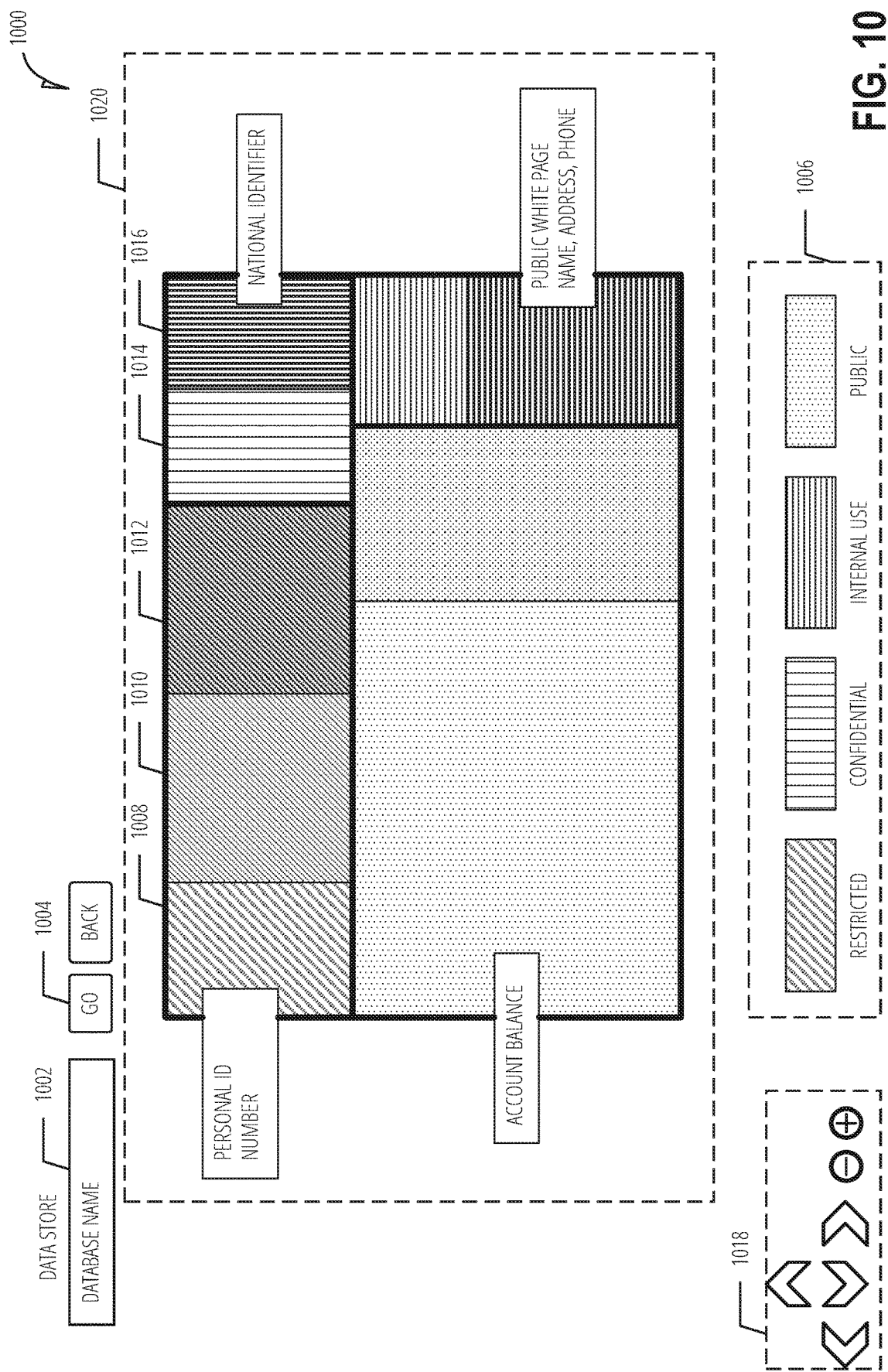
FIG. 10 is data store heat map user interface, according to various examples.

Visualization system 102 may be used to generate a variety of types of visualizations described herein. For example, visualization system 102 may present a semantic graph illustrating semantic relationships of a concept in an ontology (FIG. 2), a taxonomy graph illustrating direct relationships of a concept object in an ontology (FIG. 3), a data asset graph of a concept object in an ontology (FIG. 4), a profile of concept objects in a data store (FIG. 6), a topology of a data store (FIG. 8), or a heatmap of a data store according to semantic property (FIG. 10). Each visualization may have its own specific operations, however, many of the common operations are described below in the context of FIG. 1.

Computing device 104 may be, but is not limited to, a smartphone, tablet, laptop, multi-processor system, microprocessor-based or programmable consumer electronics, game console, set-top box, or another device that a user utilizes to communicate over a network. In various examples, a computing device includes a display module (not shown) to display information (e.g., in the form of specially configured user interfaces). In some embodiments, a computing device may comprise one or more of a touch screen, camera, keyboard, microphone, or Global Positioning System (GPS) device. Computing device 104 may use a web client or other application to transmit search query 106 to visualization system 102.

Visualization system 102 may be process search query 106 using one or more of the illustrated components. Although illustrated as a separate system from computing device 104, the operations described herein for visualization system 102 may be performed by computing device 104. For example, a self-contained application with the components and databases of visualization system 102 may be stored and executed on computing device 104.

For illustration purposes, visualization system 102 is illustrated as set of separate items (e.g., web server 108, graph visualization component 110, API 112, search component 114). However, the functionality of an individual items may be performed by a single component. A component may represent computer program code that is executable by a processing unit (e.g., a core of a general-purpose computer processor, a graphical processing unit, an application specific integrated circuit, etc.) The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

Visualization system 102 includes a number of data stores (e.g., data assets inventory knowledge base 116, operation data store 118, and ontology database 120). The data stores may be organized and stored in a variety of manners. The specific storage layout and model used in a data store may take a number of forms—indeed, a data store may utilize multiple models. The data stores may be, but are not limited to, a relational database (e.g., SQL), non-relational database (NoSQL) a flat file database, object model, document details model, graph database, shared ledger (e.g., blockchain), or a file system hierarchy. The data stores may store data on one or more storage devices (e.g., a hard disk, random access memory (RAM), etc.). The storage devices may be in standalone arrays, part of one or more servers, and may be located in one or more geographic areas.

API 112 may provide a method for computing processes in visualization system 102 and computing device 104 to exchange data. For example, API 112 may include a web-based API that permits communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored on in a database on the server. API 112 may be used to retrieve data from one or more of data assets inventory knowledge base 116, operation data store 118, and ontology database 120 and present the data on computing device 104.

API 112 may also define function calls into graph visualization component 110. For example, a function call may made be used to generate an interactive graph with icons. The function call may take a variety of parameters such as node labels and connections between nodes for generating vertices. In response, vector graphics of a graph (e.g., graph visualization 107) may be presented in a user interface on computing device 104.

Although not depicted, the servers and components of diagram 100 may communicate via one or more networks. A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network may include a single local area network (LAN) or wide-area network (WAN), or combinations of LAN's or WAN's, such as the Internet.

Web server 108 may be used to exchange information with users via a network such as the Internet. Although generally discussed in the context of delivering webpages via the Hypertext Transfer Protocol (HTTP), other network protocols may be utilized by web server 508 (e.g., File Transfer Protocol, Telnet, Secure Shell, etc.) A user may enter in a uniform resource identifier (URI), such as a host name, into a network browser (e.g., the INTERNET EXPLORER® web browser by Microsoft Corporation or SAFARI® web browser by Apple Inc.) that is associated with the logical location (e.g., an Internet Protocol address) of visualization system 102. In response, web server 108 may transmit a web page that is rendered on a display device of computing device.

Web server 108 may enable a user to interact with one or more web applications provided in a transmitted web page. A web application may provide user interface (UI) components that are rendered on a display device of a computing device. For example, visualization system 102 may host a web application that presents web pages for searching one or more of data assets inventory knowledge base 116, operation data store 118, and ontology database 120 as illustrated in the figures herein. Graph visualization component 110 and search component 114 may be part of a web application, in various examples. Search component 114 may perform SQL or SPARQL queries to data assets inventory knowledge base 116 and operation data store 118 to retrieve data for presenting the visualizations in various examples.

The user may interact (e.g., select, move, enter text into) with the UI components, and, based on the interaction, the web application may update one or more portions of the web page. For example, a user may select a different level of ontology concepts to display and graph visualization component 110 may generate a new graph for display—using techniques described below. A web application may be executed in whole, or in part, locally on a client device. The web application may populate the UI components with data from external sources or web server in various examples. The web application may issue API calls to retrieve the data. Conversely, data entered by a user into a UI component may be transmitted using an API call back to web server 108.

Ontology database 120 may be a graph database that stores triples of a set of concept objects for one or more ontologies. The triples may identify direct relationships (e.g., "is a") and semantic relationships (e.g., "has a"). Visualization system 102 may include an ontology editor (not shown) to edit and view data in ontology database 120. The ontology editor may present a series of user interface panes—simultaneously or at different times. The panes may include class a class hierarchy (e.g., direct relationships) viewer, an annotation editor, and a semantic relationship viewer.

The data presented in the user interface panes may be retrieved using SPARQL queries, in various examples, via search component 114. The class hierarchy viewer may display each of the concept objects in ontology database 120 as a hierarchical tree. A concept object may be associated with one or more annotations. An annotation may be stored as a free-text relationship with the concept object. Annotations may take many forms such as concept labels, definitions, and synonyms. Annotations may be expressed, and stored in ontology database 120, in the S-P-O format such as ["Fixed Float Interest Rate Swap"; has a; label]. Annotations may be edited, added, or removed in the annotation editor pane.

Operation data store 118 may represent a physical data store(s) of databases, tables, columns, etc., used by an organization. A data store may host one or more databases, which themselves store one or more tables that have one or more columns. In various examples, the databases in operation data store 118 are relational databases. Operation data store 118 may store the data that is used by an organization in its day-to-day operations. For example, operation data store 118 may store customer account information, user preferences, etc. Operation data store 118 may be implemented as more than one data store.

One of the challenges in searching databases in knowing the name of the searched object. For example, a user may search operation data store 118 for all entries that include "credit card identifier." However, each line of business may use a different term for "credit card identifier" in database tables such as "credit card number," "CC number," or "Credit Account Number." Additionally, ontology database 120 may use a different term entirely for "credit card identifier." Accordingly, any search results would be incomplete.

In various examples, data assets inventory knowledge base 116 may store mappings between operation data store 118 and ontology database 120. Data assets inventory knowledge base 116 may also store a common identifier for all column names for a concept. A relational database (RDB) to RDF mapping proposed W3C standard exists called R2RML. One purpose of R2RML is to facilitate a map of existing relational data—as encapsulated in one or more databases in operation data store 118—to an RDF data model. The input for an R2RML mapping is a logical table that may be a base table, a view, or a valid SQL query. The output of the R2RML is a mapping of the logical table to an RDF using a triple map. A triple map is a rule that takes each row in one of the logical tables to an RDF triple. The rule may have two components, the subject map and a multiple predicate-object map, which may be made up of predicate maps and object maps. The triple for a given database row may be formulated by combining the subject map with a predicate map and an object map.

Data assets inventory KB 404 may include a R2RML mapping between an organization's infrastructure (e.g., operation data store 118) and an ontology stored in ontology database 120. Accordingly, the map may contain all of the column names and their associated ontology concept. The ontology concept label may be the common identifier for all column names. Use of data assets inventory knowledge base 116 may enable a user to search for a concept name in an ontology and visualize which databases, etc., store data for the concept as described further herein.

Figure 2:
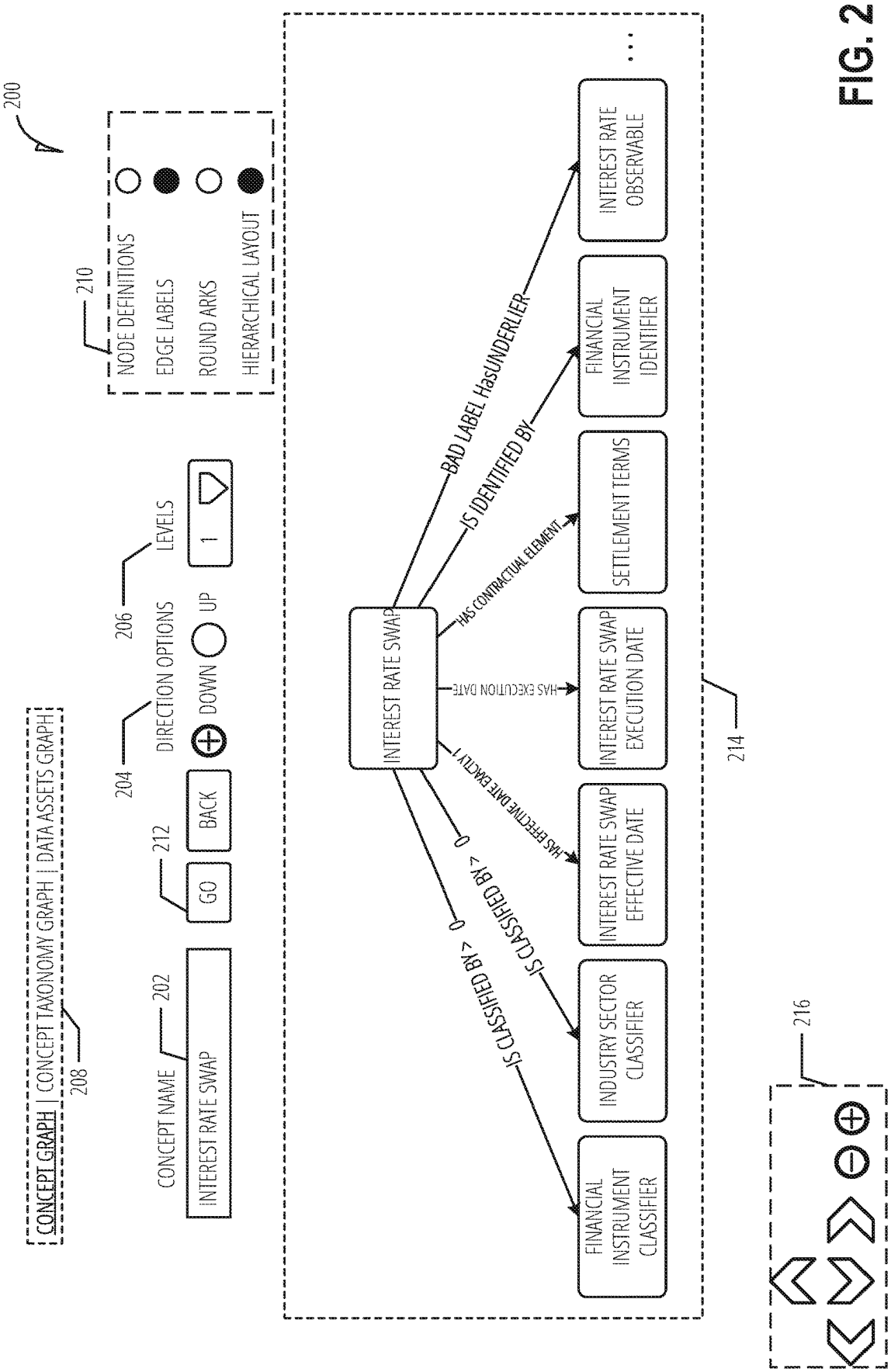
FIG. 2 is a concept semantic relations user interface, according to various examples.

FIG. 2 is a concept semantic relations user interface 200, according to various examples. User interface 200 includes search box 202, direction options 204, level selection 206, graph type selector 208, visualization options 210, search execution element 212, semantic graph 214, and navigation controls 216. User interface 200 may be presented in response to a selection of "Concept Graph" in graph type selector 208, entering in a search string in search box 202, and activating (e.g., selecting) search execution element 212.

User interface 200 may be part of a web application served from a web server (e.g., web server 108 with respect to FIG. 1). For example, a user may navigate to a URL to access the web application. In other examples, user interface 200 may be part of a standalone application executing on a user's device (e.g., tablet, personal computer, computing device 104, etc.). The web application may include a number of views for visualizing ontology data or operational data. A user may select a view type by using graph type selector 208. For example, "Concept Graph" may be selected to view user interface 200 FIG. 2, "Concept Taxonomy Graph" to view user interface 300 in FIG. 3, or "Data Assets Graph" to view user interface 400 in FIG. 4.

Semantic graph 214 may display semantic relationships of a searched concept entered in search box 202. Direction options 204 and level selection 206 may be used to determine how many properties of the searched concept are presented in semantic graph 212. For example, selecting "up" may retrieve concept objects that have "interest rate swap" as a property relationship and selecting "down" retrieves objects that have a property relationship with "interest rate swap. Level selector 106 determines how far up or down the ontology graph to traverse. As illustrated, "1" level and "down" results in the first level of properties of "interest rate swap" and being presented.

A graph database query language such as SPARQL—a recursive acronym meaning SPARQL Protocol and RDF Query Language—may be used to retrieve the properties of searched concept from ontology database 120 in FIG. 1. If multiple levels are used, the query may be repeated for each retrieved node in a level. A node may be the label of concept object or property of the semantic relationships of the searched concept. For example, if '2' levels are used, semantic properties of the financial instrument classifier, industry sector classifier, etc., may be retrieved using additional queries and presented as another layer of nodes. The results may also be fed into various statistical and visualization packages (e.g., using a SPARQL package with R in combination with the igraph library) to generate semantic graph 214. Other queries and visualization techniques may be used without departing from the scope of this disclosure.

Visualization options 210 identify a set of options for semantic graph 214. User interface 200 indicates that "edge labels" and "hierarchical layout" are currently active. The node definitions option may display definitions of a displayed node. The definitions may be stored as an annotation in ontology database 120 and be retrieved as part of one or more SPARQL queries. The definitions may be hidden until a user interacts with a node. For example, the user may place a cursor over a node or select the node to have the definition displayed. The edge label may display, on the vertices between nodes, the nature of the property relationship, which may be retrieved as a part of a SPARQL query. For example, an interest rate swap is classified by greater than zero industry sector classifiers and financial instrument classifiers.

The round arks and hierarchical layout options may control how the vertices and nodes are displayed in semantic graph 214. For example, straight vertices are shown in user interface 200 may but may be curved if the round arks option is selected. If the hierarchical layout is not selected, a radial layout may be used. Each level presented according to level selection 206 may correspond to a distance away from a center node, in various examples.

Navigation controls 216 may be used to pan around or zoom in/out of semantic graph 214. Depending on the size of the display device, there may be too many nodes in semantic graph 214 to display while maintain readability. In such instances, the user may use navigation controls 216 to zoom in to a portion of semantic graph 214.

Figure 3:
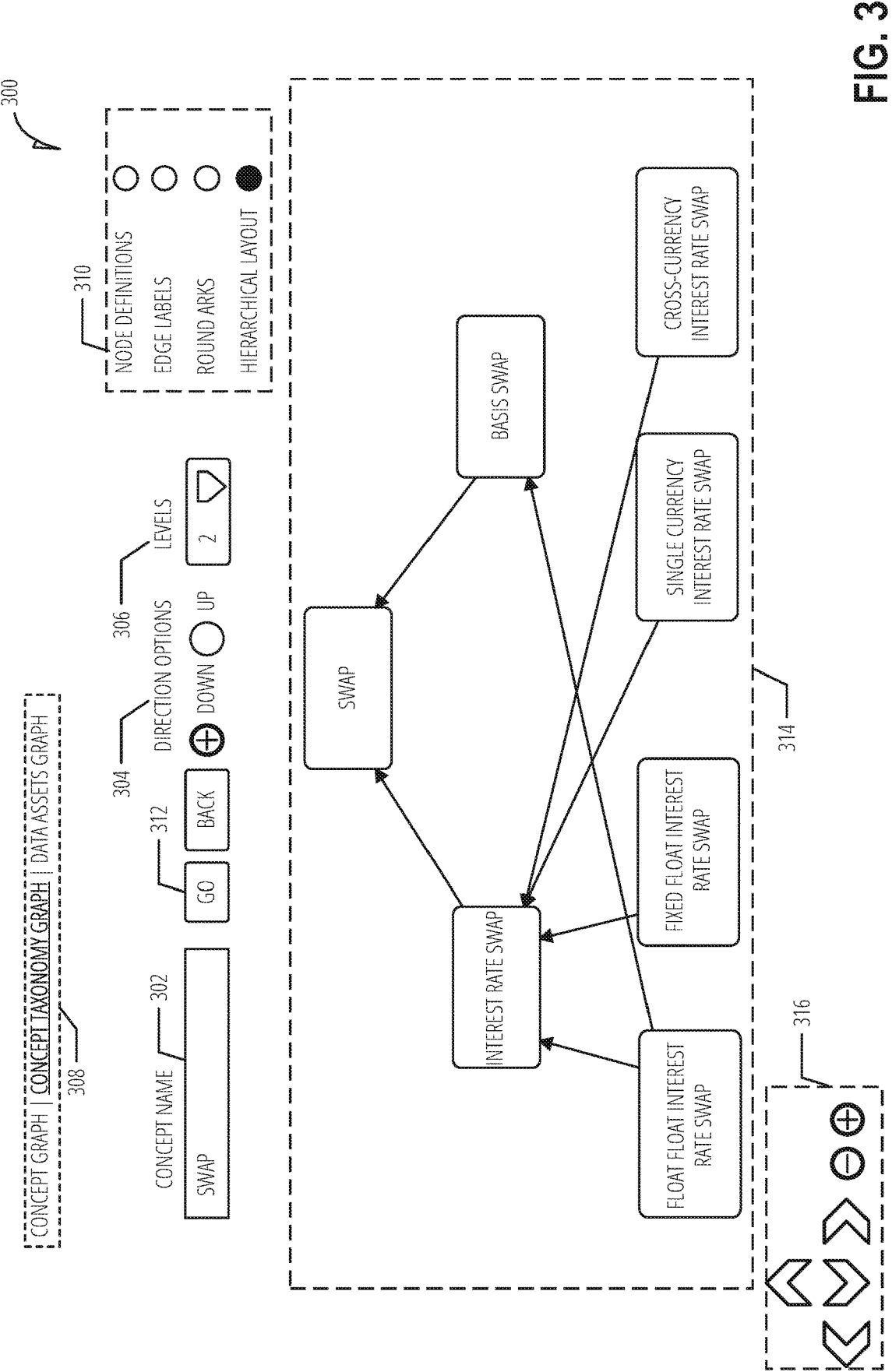
FIG. 3 is a taxonomy visualization user interface, according to various examples.

FIG. 3 is a taxonomy visualization user interface 300, according to various examples. User interface 300 includes search box 302, direction options 304, level selection 306, graph type selector 308, visualization options 310, search execution element 312, taxonomy graph 314, and navigation controls 316. Visualization options 310 and navigation controls 316 may perform similar user interface adjustments (e.g., zooms, pans, data displays, etc.) as visualization options 210 and navigation controls 216.

In various examples, visualization options 310 (as well as visualization options 210) may include more options beyond those depicted in visualization options 310. The options may relate to information that may be displayed when a user hovers over a node in a graph such as links to other types of visualization types for a node, links to external resources, or statistical information as discussed further herein.

Taxonomy graph 314 may display the direct "has a" relationships of a concept entered into search box 302 after initiating (e.g., clicking) search execution element 312. User interface 300 may be hosted as part of the same web application hosting user interface 200. A user may switch from user interface 200 to user interface 300 by selecting "Concept Taxonomy Graph" using an input device. In various examples, the query entered in to search box 202 is used automatically when switching—obviating the need for a user to use search execution element 312.

Search box 302 may be used to search for a concept in an ontology such as "Swap." Direction options 304 and level selection 306 may be used together to determine which concept objects to present from the ontology in response to the search. For example, selecting "up" retrieves superclass concept objects of the searched concept object and selecting "down" retrieves the subclass concept objects of the searched concept. Level selection 306 determines how far up or down the ontology graph to traverse. As illustrated, "2" levels and "down" results in the subclasses of "Swap" and the subclasses of the subclasses of "Swap" being presented.

The arrows in user interface 300 indicate the direct property relationship. Thus, "Interest Rate Swap" is a "Swap." A concept object may have more than one direct property relationship. For example, the "Float Float Interest Rate Swap" is a "Interest Rate Swap" and a "Basis Swap."

To generate taxonomy graph 314, a graph database query language such as SPARQL may be used to retrieve all subclasses of a concept object, such as:

select ?subclass where {
?subclass rdfs:subClassOf* :a
}

If multiple levels are used, the query may be repeated for each subclass. SPARQL may also be used to retrieve the depth of any returned classes. As with semantic graph 214, the results of the query may also be fed into various statistical and visualization packages to generate taxonomy graph 314. Other queries and visualization techniques may be used without departing from the scope of this disclosure.

A user may hover over a node to see user interface elements (e.g., links, buttons, etc.) overlaid on the node to other types of graph visualizations for the node. For example, when the currently selected graph type is "Taxonomy Concept Graph," links may be displayed for a concept graph (e.g., as shown in FIG. 2) or a data assets graph (e.g., as shown in FIG. 3). Clicking on the link may cause the web application to generate a new visualization based on the type of the selection.

For example, consider that a user hovers over the "Interest Rate Swap" node and then selects the concept graph option. A new graph may be generated—using SPARQL queries, for example—that shows the semantic relationships for "Interest Rate Swap." The options for the new graph may be the same as are currently selected in visualization options 310. The new graph may be displayed as if the user searched for "Interest Rate Swap." Accordingly, "Interest Rate Swap" would be the top-level node in a hierarchical presentation or the center node in a radial presentation. A user may be notified of the new type of graph by underlining/bolding, etc., "Concept Graph" in graph type selector 308. A user may go back to the previous graph (e.g., taxonomy graph 314) by selecting the "Back" button next to search execution element 312 in various examples.

The user may also be presented with an external graph visualization option (e.g., a reference graph). The external graph visualization may use data stored in an external data source with respect to the data stores of visualization system 102 that is not stored in ontology database 120. As indicated previously, ontology relationships may include URL links to definitions of a concepts, and a concept object in ontology database 120 may have a direct relationship with a concept object of another externally maintained ontology. Accordingly, if a user selects the reference graph option for a concept object, a request may be made to the identified URL to retrieve ontological data (e.g., semantic or direct relationships) for the concept object. For example, a "country" object may have a defined schema stored at an external URL that indicates available country options for a "country" data object. A graph may be presented with the retrieved results in a similar manner as semantic graph 214 or taxonomy graph 314.

In various examples, statistics related to a node may also be displayed when hovering over the node. The statistics may include the total number of rows in a database for a concept. For example, consider that "national identification number" is the searched concept and results include subclasses of "tax payer identification number" and "passport number," among others. The "tax payer identification number" may also include subclasses of "social security number" and "employee identification number." Statistics may be presented at each level for a node. Accordingly, statistics for the "national identification number" node may aggregate those statistics from "tax payer identification number," "passport number," "social security number," and "employee identification number." Whereas, statistics for "tax payer identification number" would aggregate those from "social security number" and "employee identification number." In contrast, statistics for the "tax payer identification number" may not include statistics for its superclass "national identification number" node.

In various examples, the statistics for a node are stored as part of data assets inventory knowledge base 116. When a user hovers over a node, a query may be made to data assets inventory knowledge base 116 to retrieve the statistics. In an example, the statistics obtained as part of the initial concept query but are not presented until a user hovers over a node.

Data assets inventory knowledge base 116 may periodically update any stored statistics. For example, assume a concept object is at the bottom of the hierarchy such that the node has no subclasses. A lookup may be performed in data assets inventory knowledge base 116 to determine which columns in operation data store 118 correspond to the concept object. The lookup may indicate that the concept is associated with three table columns (e.g., A, B, and C) in two different tables or databases. A query may be made to each database to obtain the number of rows for each of the columns. The results may indicate column A in table A of database A has 50 entries, column B in table B in database A has 100 entries, and column C in table C in database C has 75 entries. Accordingly, the statistics for the concept object may include the number of instances of the concept object (three in this example, one for each column), the total number of entries (225), and number of databases (3). Other stored statistics may identify the degrees of redundancy for a concept object (e.g., how many copies of a data store are maintained), cost projections such as the cost to maintain the data stores associated with the concept object, or the levels of sensitive data as discussed more with respect to FIG. 10.

Figure 4:
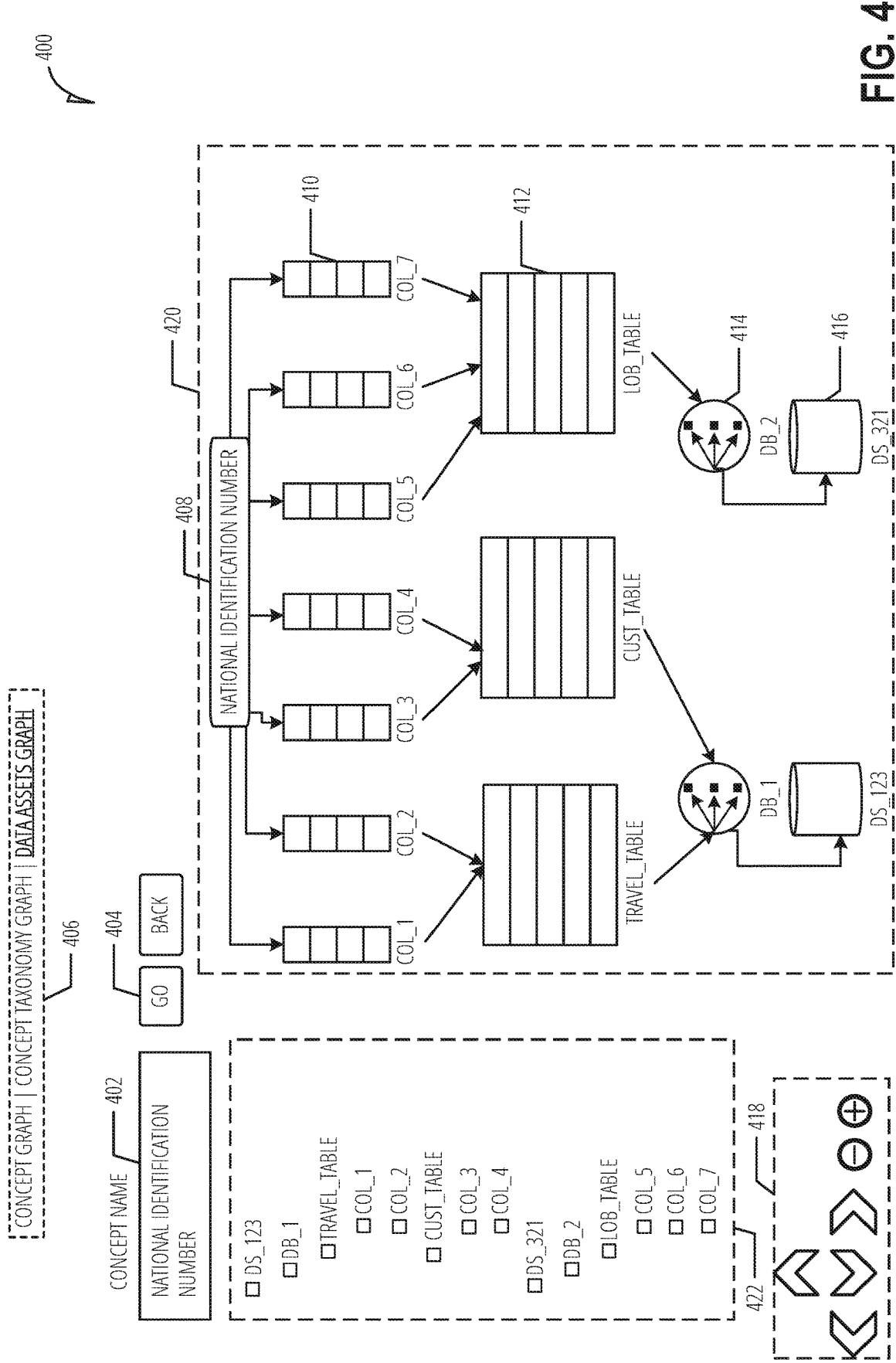
FIG. 4 is a data asset visualization user interface, according to various examples.

FIG. 4 is a data asset visualization user interface 400, according to various examples. User interface 400 includes search box 402, search execution element 404, graph type selector 406, concept node 408, column 410, table 412, schema 414, data store 416, navigation controls 418, data asset visualization 420, and tree view 422. Search box 402, search execution element 404, graph type selector 406, and navigation controls 418 may function similarly to search box 202, search execution element 212, graph type selector 208, navigation controls 216, respectively. Although not illustrated, user interface 400 may include a set of visualization options. The visualization options may include toggles for displaying concept object definitions, labels of data assets (e.g., column names, tables names, etc.), statistics of data assets when hovering over a representation of a data asset, and viewing/hiding tree view 422.

Data asset visualization 420 includes four levels of data assets below concept node 408: (1) a column level; (2) a table level; (3) a schema level; and (4) a data store level. Within data asset visualization 420, a data store may represent the logical grouping of data implemented by an organization for one or more schemas (e.g., a database). For example, data store 416 may represent a labeled and logically addressable set of data that includes schema 414. Data store 416 may also store data from other schemas that are not illustrated—due to the schemas not including any columns associated with the concept "national identification number." Data store 416 may be part of operation data store 118 in various examples.

Data asset visualization 420 may include querying one or more of data assets inventory knowledge base 116, operation data store 118, and ontology database 120. For example, visualization system 102 may query the mapping stored in data assets inventory knowledge base 116 that identifies relational database column identifiers (e.g., "COL_1", "COL_2", in data asset visualization 420) for a concept entered into search box 402.

Results of the query may also include the parent assets of the columns such as the table name, the database name, and data store associated with the columns. In some examples, the parent assets may be retrieved by querying operation data store 118 with the column names retrieved from data assets inventory knowledge base 116. Graph visualization component 110 may use the results to generate data asset visualization 420. For example, a tree data structure may be created with the columns, tables, databases, and data stores representing nodes and the vertices being the relationships between the nodes. Different icons may be used for each type (e.g., column, table, etc.) of data asset.

Tree view 422 may present a textual and hierarchical representation of the search results of the searched for concept. A user may collapse or expand different levels of tree view 422 using UI controls (not illustrated). A user may interact with tree view 422 to selectively display assets in data asset visualization 420. This may be useful when a large number of results are currently being displayed and a user wants to focus on a particular table. For example, a user may click the box next to "Cust_Table" in tree view 422. In response, tree view 422 may be updated to remove any asset not in the immediate chain (up or down) of "Cust_Table" with respect to the concept of "National Identification Number" Thus, tree view 422 may only display "Col_3", "Col_4", "Cust_Table", "DB_1", and "DS_123." A user may select "back" in user interface 400 to redisplay the other assets. In some examples, selecting a node in data asset visualization 420 may have the same effect as clicking a box in tree view 422.

Figure 5:
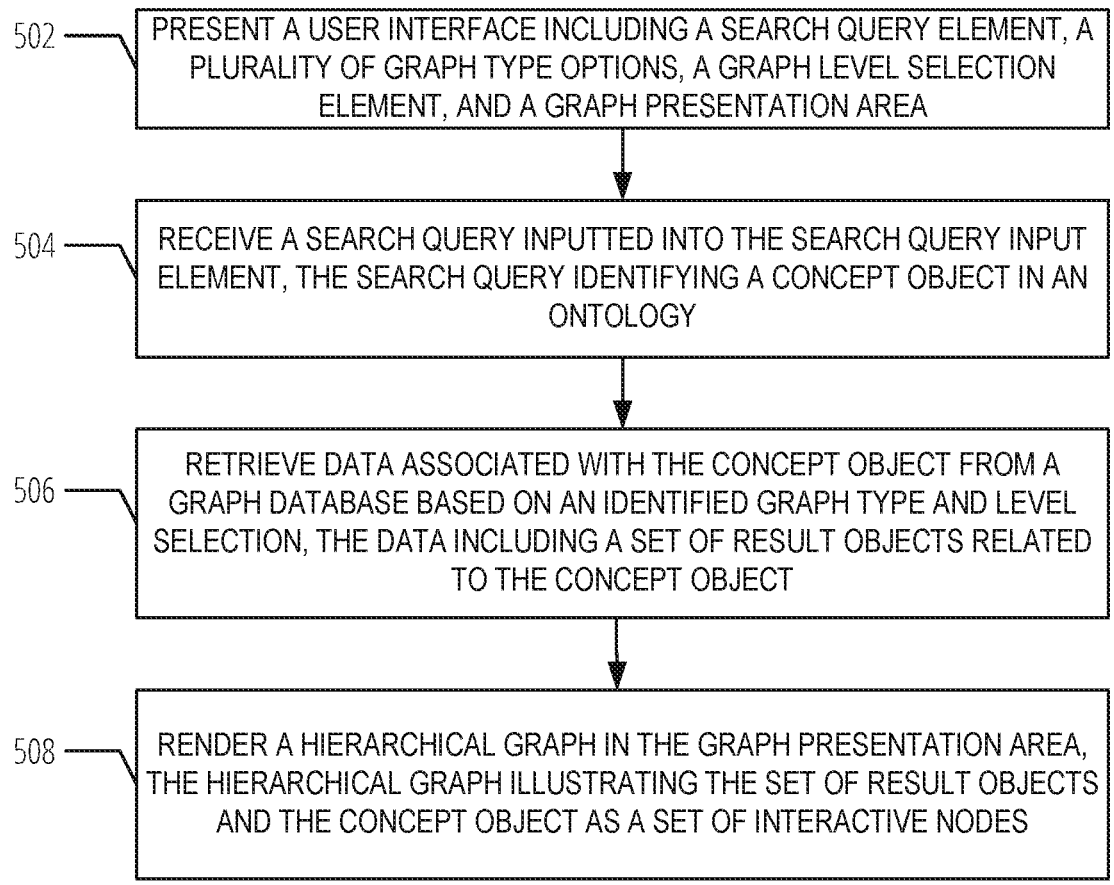
FIG. 5 is a flowchart illustrating a method to render a hierarchical graph, according to various examples.

FIG. 5 is a flowchart illustrating a method to render a hierarchical graph, according to various examples. The method is represented as a set of blocks that describe operations 502-508 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 5. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

At operation 502, in various examples, a user interface in presented on a display device of a computing device. The user interface may include a search query input element, a plurality of graph type options, a graph level selection element, a level selection, and a graph presentation area. The plurality of graph type options may be configured to identify a selection of a graph type based on a selection made by a user. The graph level selection element may be configured to identify a level selection based on a selection made by a user. The user interface may be part of a stand-alone application or as part of a web page served to the computing device, in various examples. The web page may include code that executes locally on the computing device to perform operations 502-508. Presenting the user interface and remaining operations of the method may be performed using a system such as depicted in FIG. 1.

At operation 504, in various examples, a search query inputted into the search query input element is received. The search query may identify a concept object in an ontology. The search query may be received by a server that serves a web page presenting the user interface or be received by a stand-alone application. In various examples, the search query is used as an input to a database such as ontology database 120. The results of the query may identity the concept object. In various examples, if the graph type is a data asset graph type, the search query may be used an input to another data store such as operation data store 118 or data assets inventory knowledge base 116 to identify data assets associated with the concept object.

At operation 506, in various examples, data associated with the concept object may be retrieved from a graph database (e.g., ontology database 120). The data retrieved may be based on an identified graph type and level selection. The data may include a set of result objects related to the concept object. The result objects may be data assets, other concept objects, or properties of a concept object in various examples. The data may include metadata (statistics, labels, definitions, relationship prosperities, etc.) about the concept objects or data assets.

The level selection element may determine a graph distance threshold from the identified concept object to include in the set of results objects. Graph distance may be determined according to vertices traversed between the identified concept object and a potential concept object to include in the set of results. For example, if the level selection is '2,' results may exclude any concept object farther that requires more than two vertices to be traversed. A level direction option may also be used that indicates the level of traversal (e.g., up or down) the graph.

When the graph type is a concept taxonomy graph the set of results objects may be directly related concept objects to the identified concept object. For example, the set of result objects may be concept objects that have a "is a" relationship with the concept object. The data retrieved from the graph database may include these concepts. When the graph type is a concept graph, the set of results objects may be semantically related concepts objects to the identified concept object.

When the graph type is a data assets graph, the set of results objects may be data assets related to the concept object. The data assets may include relational database columns that store data associated with the concept object. A label of the concept object may be included as part of the data associated with the concept object that is retrieved from a graph database. The concept label may be used as input to a mapping between the concept object and data assets to identify the set of interactive nodes to include in the hierarchical graph at operation 608.

At operation 508, in various examples, a hierarchical graph is rendered in the graph presentation area. The hierarchical graph may illustrate the set of result objects and the concept object as a set of interactive nodes. The user interface may also include display options to present data when a user interacts with a node such as by hovering over a node or clicking on the node. The display options may include an option to display a definition, label vertices according to relationships between concept objects, or links to display other types of graphs for a selected node.

For example, the hierarchical graph may include vertices between the set of interactive nodes and the vertices may be labeled according to their respective sematic relationships. In an example, an interaction with a node of the set of interactive nodes may be received. In response, a definition of the node may be presented in the graph presentation area. For example, the node may appear at the location of a cursor or touch point that has made initiated the interaction.

In various examples, an interaction with a node of the set of interactive nodes may be received. Based on the interaction, a set of graph types may be presented for the node. The graph types may be presented at the location of a cursor or touch point that has made initiated the interaction. A selection of one of the presented graph types may be received. Using a search concept identified by the selection (e.g., the label of the node) to render a new hierarchical graph in the graph presentation area according to the graph selection. In various examples, a user may be switch between graph types for the currently searched concept object by using the plurality of graph type options displayed in the presentation area without needing to hover over or interact with the originally searched for concept object.

In various examples, statistics for a node may be displayed for when a user interacts with a node. For example, if the node is a column data asset, the statistics may include the datatype, the inferred database, min length, max length, primary key, percentage unique, and percentage null for the column. If the node is a table or database, the statistics may be the total number of records.

Traditionally, if a user conducted a search of a relational database (e.g., using an SQL query), the results would be unmodified and potentially have no readily apparent relationship to concepts in an ontology. So, for example, if the SQL query was "SELECT*FROM T_CREDIT_CARD_INFO" the results may be a set of entries under column headings of "ID", "BAL", and "LIMIT." Without communicating with the database modeler that designed the schema for the table, it may be impossible to know what these column headings represent.

The problem becomes further compounded when trying to find data across multiple tables because a column label may be used multiple times. For example, a table "CUST_INFO" may also have a column heading of "ID." Accordingly, a user trying to determine what "ID" represents would also need to know the table name, and if multiple databases are used, the database name.

Even if a user manages to find the database modeler (or some similarly knowledgeable personnel) it is unlikely the user may be able to determine what concept in an ontology the column heading represents. Accordingly, if a user is trying to assess the security risk a particular database table represents or understand what data is stored, existing search methods are insufficient. To rectify this deficiency a novel search method and user interface may be used.

Figure 6:
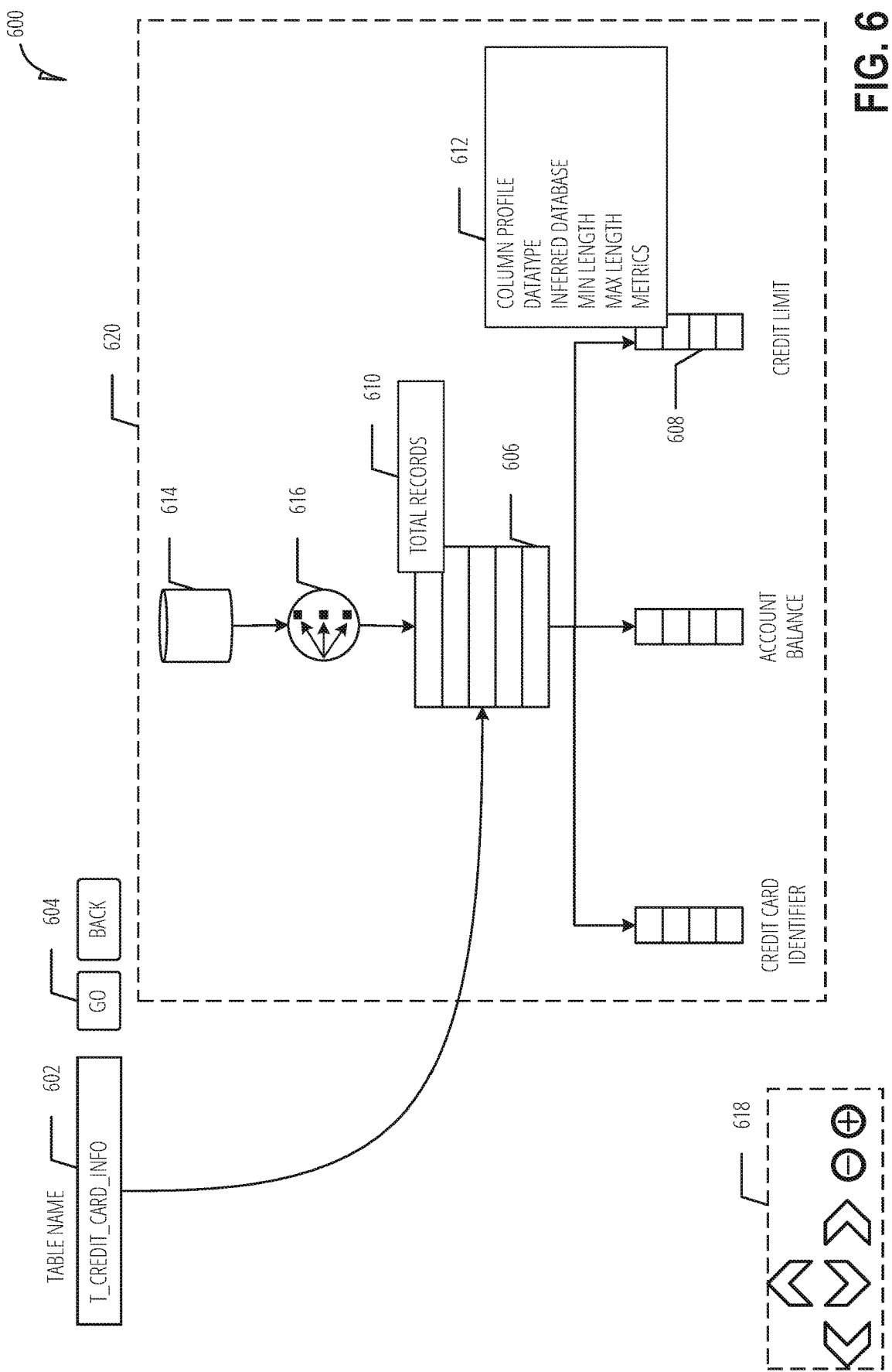
FIG. 6 is a data asset search user interface, according to various examples.

FIG. 6 is a data asset search user interface 600, according to various examples. User interface 600 includes search box 602, search execution element 604, and navigation controls 618. When a user searches for a data asset element, such as a table, and clicks search execution element 604, data asset profile visualization 620 may be presented. Data asset profile visualization 620 may include one or more columns, tables, schemas, and data stores. As illustrated, data asset profile visualization 620 includes data store 614, schema 616, table 606, and column 608. In contrast to FIG. 4 in which the search input is a concept in an ontology and the output is a graph showing data assets that include the search concept, the search input in FIG. 6 is a data asset and the output is a graph of data assets with labels of ontology concepts. Navigation controls 618 may function in a similar manner as described with respect to navigation controls 216.

Data asset search user interface 600 may be part of a web application served from a web server (e.g., web server 108 with respect to FIG. 1). For example, a user may navigate to a URL to access the web application. In other examples, data asset search user interface 600 may be part of a standalone application executing on a user's device (e.g., tablet, personal computer, computing device 104, etc.). The web application may be part of the same web application that presents the search interfaces in user interface 200, user interface 300, and user interface 400 in FIGS. 2, 3, and 4, respectively. Although not illustrated in data asset search user interface 600, a list of the available types of search interfaces may be presented to allow a user to quickly switch between search interfaces.

A user may use data asset search user interface 600 to determine what concept objects are stored within a data asset. As illustrated, search box 602 is presented as a table search, but other types of data assets may also be searched. For example, a database name may be used as a search input. A default result view such as data asset profile visualization 620 may be present a four-level hierarchical graph in which nodes on the graph represent different data assets types. Different icons may be used for the different types of data assets.

Although not shown, data asset search user interface 600 may include a list of visualization options. The visualization options may include a level selection. The level selection may be used to determine how far "up," with respect to the searched asset, other data assets should be shown. Up may follow a progression of column to table to schema to database. For example, a level of '1' may only show the columns contained in the searched for data asset, whereas a level of '4' may present a graph as shown in data asset profile visualization 620.

Another visualization option may to show data asset labels. Data asset labels may be distinct from the ontology concepts labels of data assets. For example, in FIG. 4, the columns are identified by their data asset labels as would appear in a table schema (e.g., COL_1, etc.) The columns, however, in data asset profile visualization 620 are illustrated with their ontology concept labels. The ontology concept labels may represent a mapping between the data asset label and a concept label as found in data assets inventory knowledge base 116, for example.

A visualization option may also be included to display statistics for a data asset in data asset profile visualization 620. As illustrated, table statistics 610 may include the total number of records for table 606. Table statistics 610 may be hidden until a cursor or other input element is placed over table 606. Column statistics 612 may include a column profile that indicates the datatype, an inferred database, the min/max length of entries, and metrics (e.g., number of null values) for the column. Column statistics 612 may be hidden until a cursor or other input element is placed over column 608.

A user may interact with the data assets in data asset profile visualization 620 to update the presented graph. For example, a user may click on data store 614 and a graph may be presented with every table in data store 614 and each column in each table. The columns may show their ontology concept labels. A user may isolate a table may be clicking on it in the graph. Isolating may mean the other tables are removed from the graph. A user may click on the back control in data asset search user interface 600 to return to a previously displayed graph.

Figure 7:
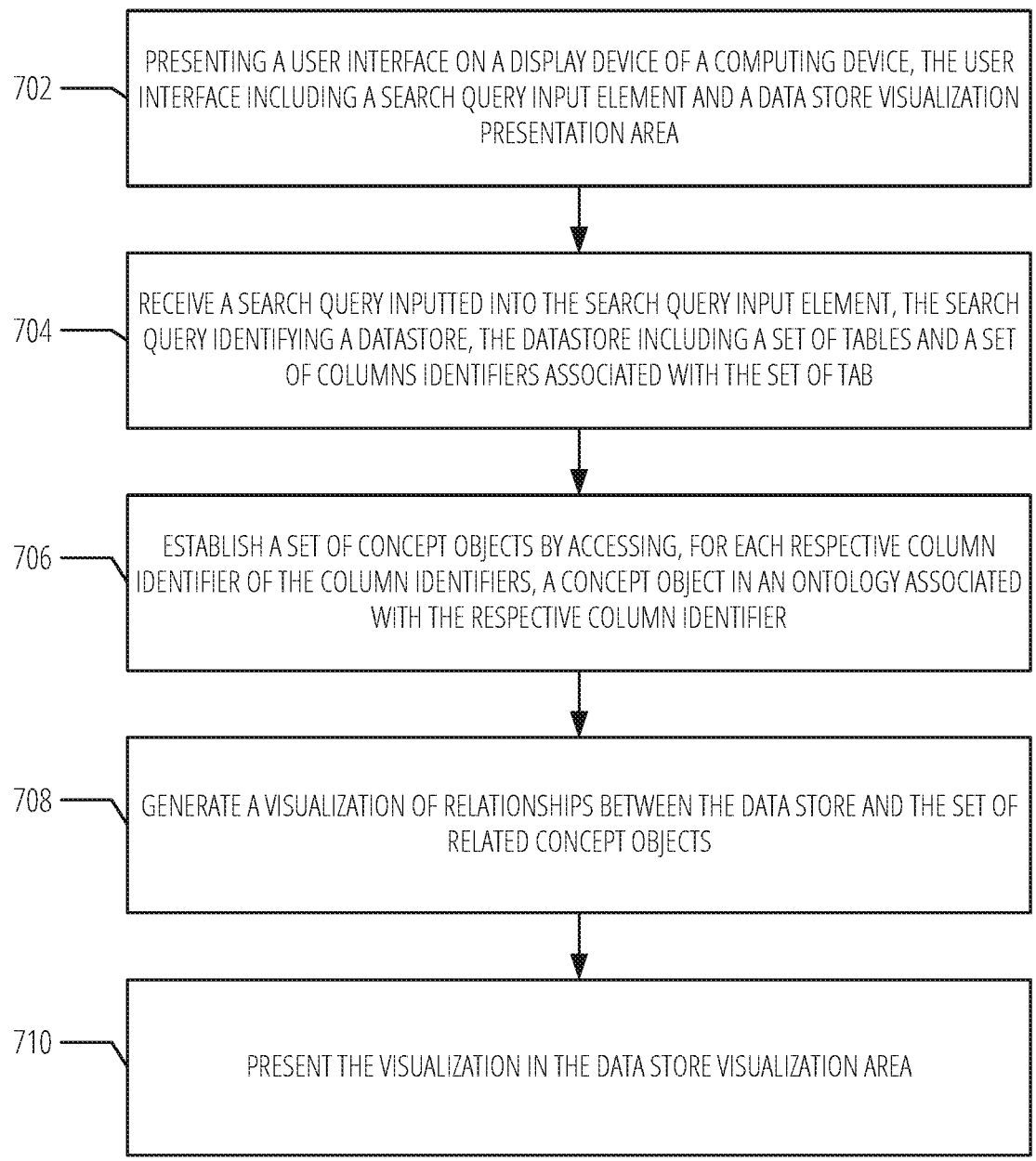
FIG. 7 is a flowchart illustrating a method to render a hierarchical data asset graph, according to various examples.

FIG. 7 is a flowchart illustrating a method to render a hierarchical graph, according to various examples. The method is represented as a set of blocks that describe operations 702-710 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 7. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

Operation 702, in various examples, presents a user interface on a display device of a computing device. The user interface may include a search query input element and data store visualization presentation area. The user interface may include additional components such as options to go back to previous visualizations and navigation controls to pan and zoom around graphics depicted in the visualization area. The user interface may be part of a stand-alone application or as part of a web page served to the computing device, in various examples. The web page may include code that executes locally on the computing device to perform operations 702-710. Presenting the user interface and remaining operations of the method may be performed using a system such as depicted in FIG. 1.

Operation 704, in various examples, receives a search query inputted into the search query input element. The search query may identify a data store. The data store may be identified directly or indirectly (e.g., using word stemming or fuzzy search). The data store may include a table with a set of columns with associated column identifiers. The column identifiers may be defined in a schema for the data store. In some examples, a smaller data unit such as a table may be searched for instead of a data store which may include multiple tables.

Operation 706, in various examples, establishes a set of concept objects by accessing, for each respective column identifier of the column identifiers, a concept object in an ontology associated with the respective column identifier. For example, the column identifier may be used as search criteria in an R2RML mapping or data assets inventory knowledge base 116. The results of the search may identify the concept object associated column identifier.

Operation 708, in various examples, generates a visualization of relationships between the data store and the set of concept objects. At operation 710, the visualization may be presented in the data store visualization area. The visualization may be presented in a variety of forms such as a hierarchical graph or radial map comprised of nodes and edges. The tables and columns may be presented as nodes. In some examples, instead of labeling the columns by their column IDs, the concept object for the column is presented instead. The concept object may be presented as a label adjacent (e.g., beneath, above, left, or right) to the depiction of the column.

Different types of objects in the visualization may be presented as different types of icons. For example, a table may be presented as a set of rows of a first width and the columns as a table with a second width that is smaller than the first width (e.g., as shown in FIG. 6). Other objects may also be presented in the visualization as nodes as such as a schema or a database for the tables and columns.

The operations may further include interacting with the presented nodes. For example, an interaction (e.g., a cursor hover-over, a click of an input device on the node) may be received with respect to a node of a column of the set of columns. Based on the interaction, profile information may be retrieved for the column. The profile information may include the column's identifier and data type for the column. The profiled information may be presented until the interaction ceases (e.g., the cursor is no longer over the node or the user clicks elsewhere). The information may be presented overlaid or adjacent to the interacted with column node in various examples.

The operations may further include interacting with the presented nodes. For example, an interaction (e.g., a cursor hover-over, a click of an input device on the node) may be received with respect to the table. Based on the interaction, statistical information may be retrieved for the table. The statistical information may include the total number of records (e.g., rows) for the table. The statistical information may be presented until the interaction ceases (e.g., the cursor is no longer over the node or the user clicks elsewhere). The information may be presented overlaid or adjacent to the table node in various examples.

In some examples, the amount of data depicted in the visualization area may be restricted by a user selecting (e.g., clicking) on a node. For example, if multiple tables are presented a user may select one. Based on the selection, the other tables and their associated columns may be removed from the visualization. A user selects a "back" option to have the entire visualization presented again.

Another difficulty in visualizing data may be trying to quickly ascertain the type of data stored in a data store, but in the context of concept objects from an ontology. Furthermore, traditional attempts at visualizing databases and how the various tables interact lead are often confusing to people that are not knowledgeable about entity-relationship-diagrams or uniform modeling language depictions of data. As such, an improved user interface may be generated that informs a user of the size, categorization, and connections between tables of a database.

Figure 8:
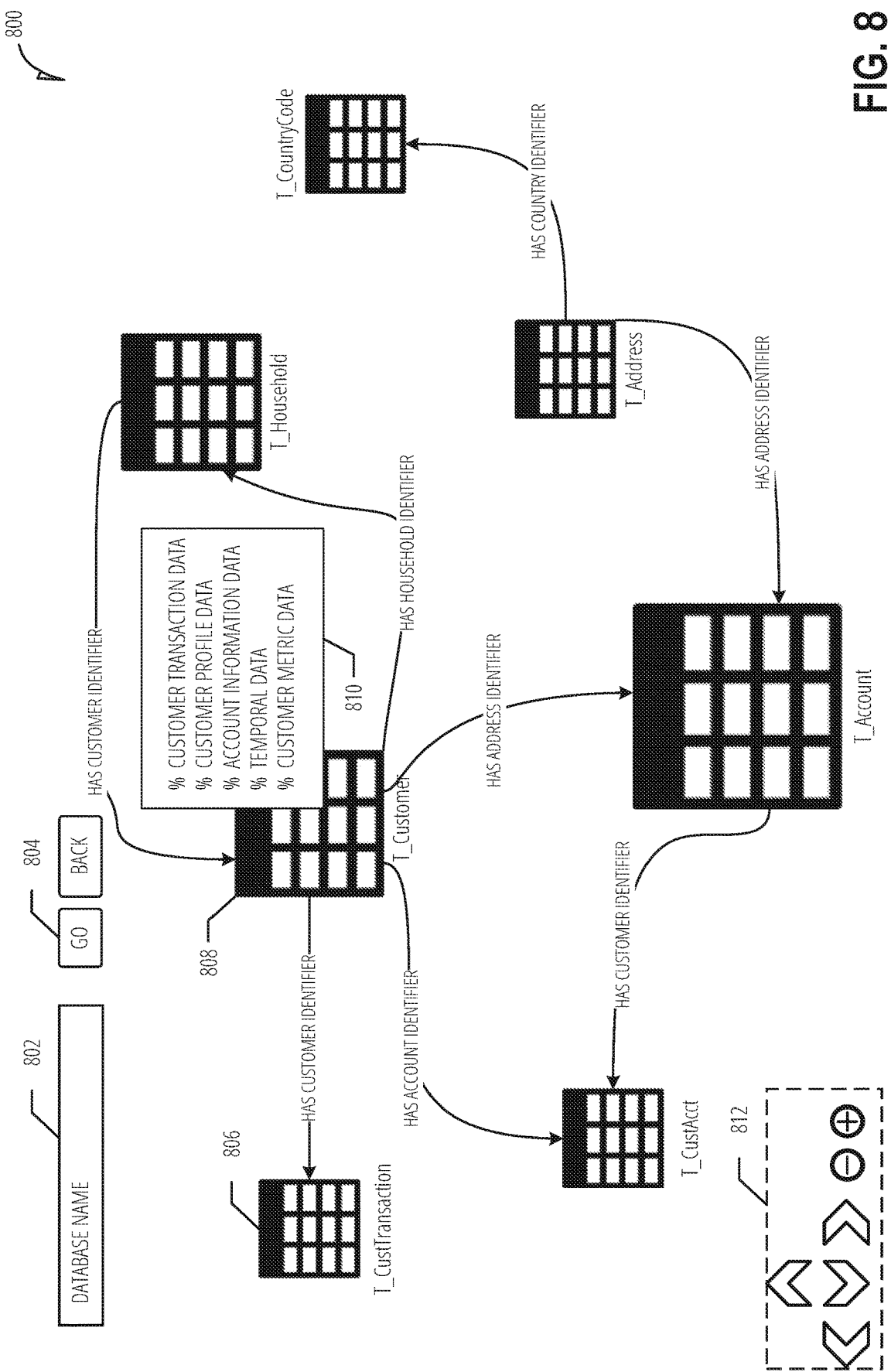
FIG. 8 is a data asset topology user interface according to various examples.

FIG. 8 is a database search interface 800, according to various examples. FIG. 8 includes search box 802, search execution element 804, node 806, node 808, table categorization 810, and navigation controls 812. Navigation controls 812 may function in a similar manner as described with respect to navigation controls 216.

Database search interface 800 may be part of a web application served from a web server (e.g., web server 108 with respect to FIG. 1). For example, a user may navigate to a URL to access the web application. In other examples, database search interface 800 may be part of a standalone application executing on a user's device (e.g., tablet, personal computer, computing device 104, etc.). The web application may be part of the same web application that presents the search interfaces in user interface 200, user interface 300, and user interface 400 in FIGS. 2, 3, and 4, respectively. Although not illustrated in database search interface 800, a list of the available types of search interfaces may be presented to allow a user to quickly switch between search interfaces.

A user may use database search interface 800 to determine the structure of a database and what categorization of concept objects are stored within each table of the database. As illustrated, search box 802 is presented as a database table search, but other types of data assets may also be searched. For example, a table name may be used as a search input.

Upon activating search execution element 804, a visualization of the tables in the searched for database may be presented. The results may be based on an SQL query (e.g., via search component 114) that obtains the table identifications for the searched for database. An additional set of queries may be made to obtain size and categorization data for each of the tables. Size may be based on the number of rows in a database or the amount of data (e.g., in bytes).

The categorization data may be based on a preset or user selected set of categories. For example, FIG. 8 depicts five different categories of data. In order to determine the amount of rows or bytes in each category search component 114 may iterate through the column identifiers for each column in each table. Data assets inventory knowledge base 116 may be queried to obtain the correlated concept objects with the column identifiers as explained previously.

Data assets inventory knowledge base 116 may also maintain a higher-level categorization of some or all of the concept objects. For example, the higher-level categorizations may include a privacy level, whether or not the data is customer transaction data, customer profile data, temporary data, or customer metric data, among other categories. Based on the higher-level categorizations, it may be calculated how much data/row each table contains for each category.

Furthermore, a query may be made, or a schema may be used to determine what column identifiers are available for join queries between the tables (e.g., common column identifiers between tables). The column identifiers may also be mapped to a concept object which may be displayed in the visualization presented in FIG. 8. For example, T_Customer has a customer identifier as does T_CustTransaction.

A default result view may include all tables from the database entered into search box 802 presented as a series of nodes. The tables may be illustrated as connected by their common column identifiers. In some examples, the connection may be labeled according to the concept object associated with the common column identifier. Each table may be represented by a common icon (e.g., a table icon) but with different formatting of the icon between tables. Formatting may include size and color. In some examples, the tables are represented by different icons.

The formatting of each table may be set according to the amount of data or rows in a table compared relatively to other tables in the database. For example, there may be a base size (e.g., width and height) of a table. If a table is 20% bigger than the median table size, the icon may be 20% bigger than the base size in various examples. Each table may be presented in a different color according to various examples.

Although not shown, database search interface 800 may include a list of visualization options. The visualization options may include showing data asset labels. Data asset labels may be distinct from the ontology concepts labels of data assets. For example, in FIG. 9, the tables are identified by their data asset label (e.g., table name) as would appear in a table schema (e.g., T_Household, etc.) The labels may be presented below the table icons. In some examples, an option may be presented to use the column identifier instead of the concept object on the connections between the tables.

A visualization option may also be included to display categorizations for a table when a user interacts with a table via its depiction such as table categorization 810. Table categorization 810 may be hidden until a cursor or other input element is placed over node 808. Node 808 may include the percentage of rows or data in the table. Table categorization 810 may be hidden once the cursor moves off of node 808.

A user may interact with the data assets in database search interface 800. For example, a user may click on node 808. In response, a new chart may be presented by itself of the categorization of the table represented by node 808. For example, a pie chart may be presented. A user may click on the back control in database search interface 800 to return to the previously displayed visualization with all the tables.

Figure 9:
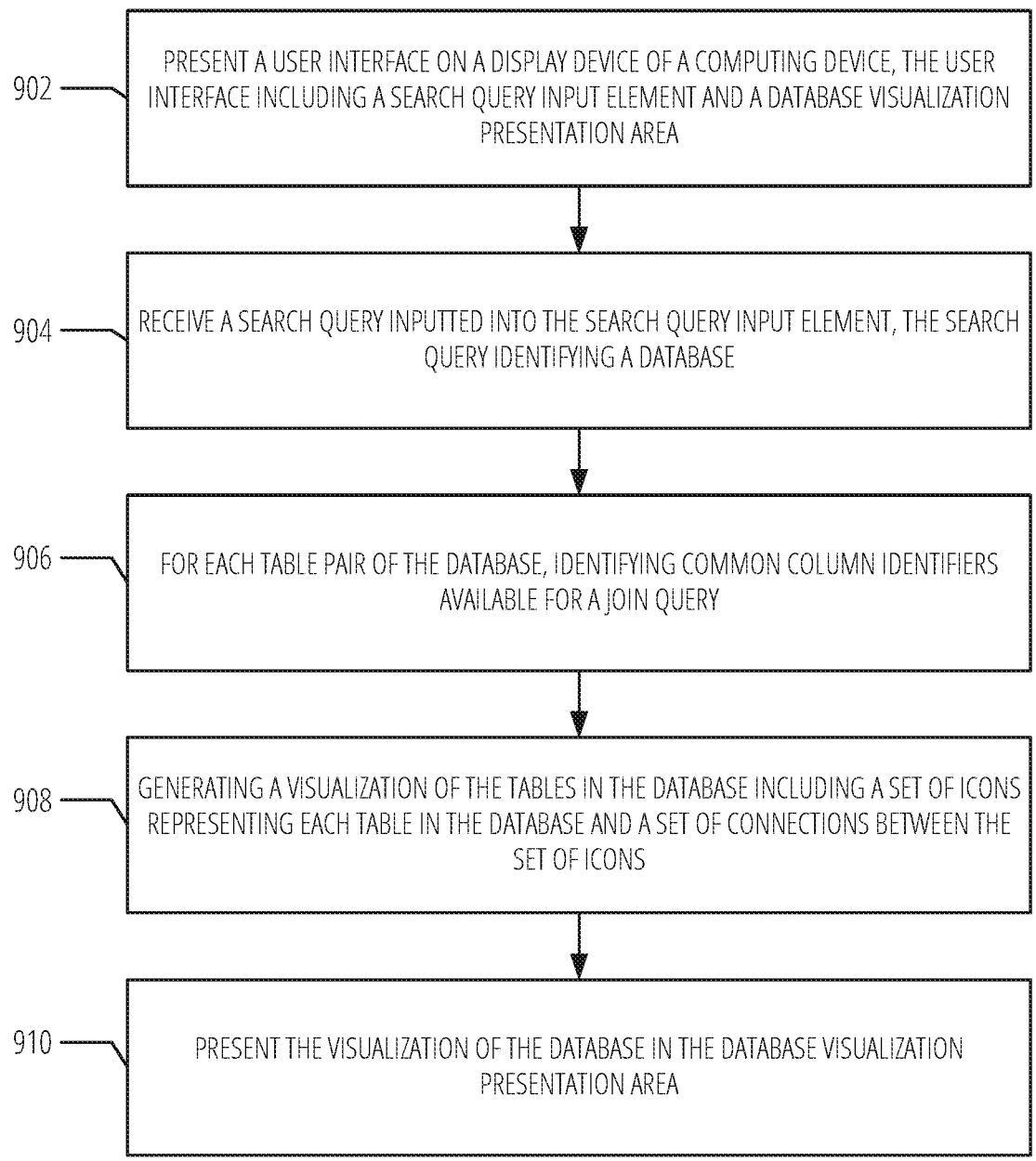
FIG. 9 is a flowchart illustrating a method to render a database visualization, according to various examples.

FIG. 9 is a flowchart illustrating a method to render a database visualization, according to various examples. The method is represented as a set of blocks that describe operations 902-910 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 9. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

Operation 902, in various examples, includes presenting a user interface on a display device of a computing device. The user interface may include a search query input element and a database visualization presentation area such as depicted in FIG. 8. The user interface may be part of a stand-alone application or as part of a web page served to the computing device, in various examples. The web page may include code that executes locally on the computing device to perform operations 902-910. Presenting the user interface and the remaining operations of the method may be performed using a system such as depicted in FIG. 1.

Operation 904, in various examples, includes receiving a search query inputted into the search query input element, the search query identifying a database. The database may be identified directly or indirectly (e.g., using word stemming or fuzzy search). The database may include a set of tables with respective sets of columns with associated column identifiers. The column identifiers may be defined in a schema for the database. In some examples, a smaller data unit such as a table may be searched for instead of a database.

Operation 906, in various examples, includes for each table pair of the database, identifying common column identifiers available for a join query. For example, common column identifiers between each pair of tables may be identified. In various examples, the connections may be labeled according to concept objects in a semantic ontology correlated with a column identifier.

Operation 908, in various examples, includes generating a visualization of the tables in the database. The visualization may include a set of icons (e.g., nodes). Each icon in the set of icons may represent a different table of the database. Different colors may be used for each table. A size of a respective icon in the set of icons may be relative to a total number of rows in the respective table compared to a total number of rows across all the tables in the database. Other statistical measure may be used to determine the size of an individual icon (e.g., a percentage increase to the average size of a table). The visualization may also include a set of connections between the set of icons. Each connection in the set of connections may correspond to a column identifier in the identified column identifiers.

Operation 910, in various examples, includes presenting the visualization of the database in the database visualization presentation area.

The method in FIG. 9 may include additional operations. For example, an interaction (e.g., a cursor hover-over, a click of an input device on the icon) may be received with a first icon of the set of icons. In response to the interaction statistics for a table represented by the first icon may be presented. The statistics may include a breakdown of data stored in the table according to a set of categories.

Determining the categorical breakdown for the first may table may include, for each respective column identifier in the table, retrieving a concept object for the respective column identifier. The concept object may be retrieved in another data store such as data assets inventory knowledge base 116. For each concept object a category for the concept object may be retrieved and the percentage of data items in the table for the category may be calculated. The statistics may include a number of rows in the table.

Another difficulty in visualizing data may be trying to quickly ascertain the amount of data in a datastore that is potentially customer data and what access level is given for each data item. By leveraging an ontology, different concept objects may be given different classifications and used in conjunction with a relational database to produce an overview of potential risk on a per data store level for the customer data. Navigation controls 1018 may function in a similar manner as described with respect to navigation controls 216.

FIG. 10 is data store heat map user interface 1000, according to various examples. User interface 1000 includes search box 1002, search execution element 1004, legend 1006, navigation controls 1018, chart presentation area 1020, and segments 1008-1016.

Chart presentation area 1020 include a chart that has been segmented into primary and secondary segments. For example, segments 1008, 1010, 1012 are secondary segments that collectively form a primary segment. Similarly, segments 1014 and 1016 form another primary segment. Legend 1006 only presents a pattern of one of the secondary segments for a primary segment merely for illustration purposes. Furthermore, although each of the primary segments is represented by a type of pattern (e.g., stripes, dots, vertical lines, horizontal lines) other formatting may be used. For example, a primary segment may be red, and each secondary segment may be a different shade of red. Additionally, the chart is presented as a rectangle, but other shapes may be used without departing from the scope of this disclosure.

User interface 1000 may be part of a web application served from a web server (e.g., web server 108 with respect to FIG. 1). For example, a user may navigate to a URL to access the web application. In other examples, user interface 1000 may be part of a standalone application executing on a user's device (e.g., tablet, personal computer, computing device 104, etc.). The web application may be part of the same web application that presents the search interfaces in user interface 200, user interface 300, and user interface 400 in FIGS. 2, 3, and 4, respectively. Although not illustrated in user interface 1000, a list of the available types of search interfaces may be presented to allow a user to quickly switch between search interfaces.

A user may use search box 1002 to determine the classifications of data stored within a data store. As illustrated, search box 1002 is presented as searching a database, but other types of data assets may also be searched. For example, a table name may be used as a search input.

Upon activating search box 1002, a visualization of the classification of the data in the searched for database may be presented. The results may be based on an SQL query (e.g., via search component 114) that obtains the table identifications for the searched for database. An additional set of queries may be made to obtain size and classification for each for each columns in the tables. Size may be based on the number of rows in a database or the amount of data (e.g., in bytes).

The classification of the data may be based on a preset or user selected set of classifications. For example, FIG. 10 depicts four different classifications of customer data. Similarly, although customer data is discussed, any category or classification may be used. In order to determine the amount of rows or bytes in each classification, search component 114 may iterate through the column identifiers for each column in each table. Data assets inventory knowledge base 116 may be queried to obtain the correlated concept objects with the column identifiers as explained previously.

Data assets inventory knowledge base 116 may also maintain the classification of each concept object. Based on the higher-level categorizations, it may be calculated how much data/row belongs in each classification. Each of the classifications may be set as a primary segment for the chart in chart presentation area 1020.

Although not shown, user interface 1000 may include visualization options. The visualization options may include showing concept object labels overlaid on the secondary segments. In FIG. 10, only four labels are presented for readability. In some examples, a single label may include all the labels for the primary segment as represented by "Public white page, name, address, phone" in FIG. 10. In some examples, a user may interact with the secondary segments by clicking or hovering over the segment to display the concept object.

Figure 11:
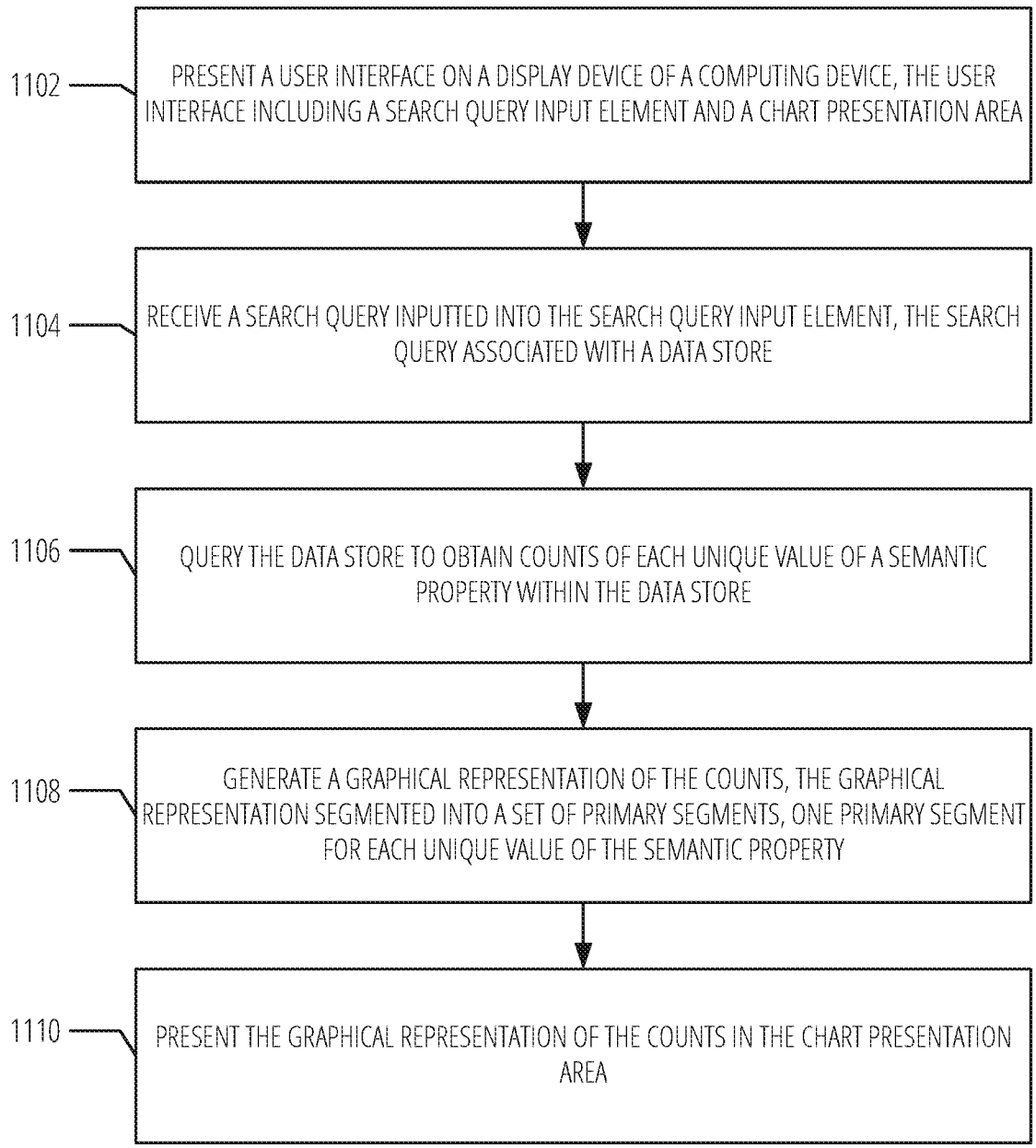
FIG. 11 is a flowchart illustrating a method to render a database visualization, according to various examples.

FIG. 11 is a flowchart illustrating a method to render a database visualization, according to various examples. The method is represented as a set of blocks that describe operations 1102-1110 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 11. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure Operation 1102, in various examples, includes presenting a user interface on a display device of a computing device, the user interface may include a search query input element and a chart presentation area. The user interface may be part of a stand-alone application or as part of a web page served to the computing device, in various examples. The web page may include code that executes locally on the computing device to perform operations 1102-1110. Presenting the user interface and the remaining operations of the method may be performed using a system such as depicted in FIG. 1.

Operation 1104, in various examples, includes receiving a search query inputted into the search query input element, the search query associated with a data store. The data store may be identified directly or indirectly (e.g., using word stemming or fuzzy search). The data store may include a set of tables with respective sets of columns with associated column identifiers. The column identifiers may be defined in a schema for the database. In some examples, a smaller data unit such as a table, may result from the search.

Operation 1106, in various examples, includes querying the data store to obtain counts of each unique value of a semantic property within the data store. The semantic property may be a classification level of a concept object. For example, the classification may be a set of privacy levels for customer data. Column identifiers of the columns in each table may be mapped to various concept objects in an ontology. The concept objects may each have a classification level. Accordingly, the count may be the number of cells in the data store that have each classification level.

Operation 1108, in various examples, includes generating a graphical representation of the counts. The graphical representation may be a geometric shape in various examples. The graphical representation may be segmented into a set of primary segments, one primary segment for each unique value of the semantic property. For example, if there are four classification levels there may be four primary segments.

The primary segments may be delineated in a chart using formatting techniques such as a thick border. A size of a primary segment for a unique value of the semantic property within the graphical representation may be relative to a sum of the counts of each unique value of the semantic property. For example, if classification A makes up 40% of all data in the data store, the primary segment for classification A should be 40% of the chart.

In various examples, each respective primary segment is segmented into a respective set of secondary segments. The secondary segments may be partitioned according to their respective sizes within the primary segment. Each secondary segment may be associated with a respective concept object in an ontology. The operations may further include querying the data store to obtain a count of entries within the data store associated with each respective concept object.

A size of the respective secondary segment within the graphical representation may be relative to a sum of the counts of each unique value of the semantic property. For example, if the count for concept A makes up 20% of classification A, the secondary segment for concept A should be of a sized of 20% of the size of the primary segment for classification A.

In various examples, each primary segment is presented using a different visual identifier of a set of visual identifier classes. For example, the set of visual identifier classes may be a set of colors. Thus, each primary segment may be assigned a different color. Each secondary segment within a primary segment may be presented in a different shade of the primary segment's assigned color.

In various examples, an input may be received associated with a secondary segment. In response to the input, a concept label associated with the secondary segment may be presented. The input may be a hover over input on the secondary segment within the graphical representation.

Operation 1110, in various examples, includes presenting the graphical representation of the counts in the chart presentation area.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 12:
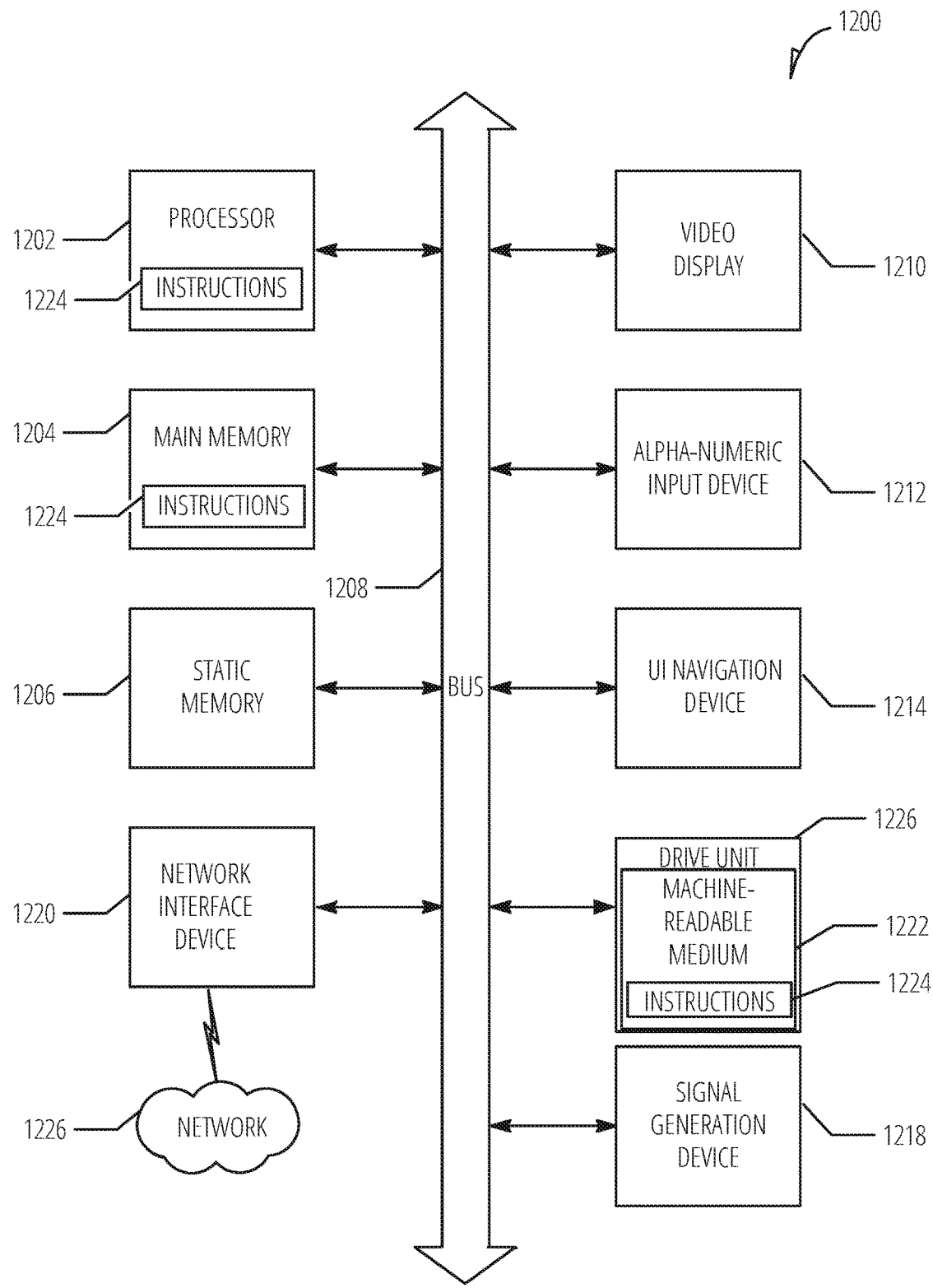
FIG. 12 is a block diagram illustrating an example machine upon which any one or more of the techniques (e.g., methodologies) discussed herein may be performed, according to an example embodiment.

FIG. 12 is a block diagram illustrating a machine in the example form of a computer system 1200, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1200 includes at least one processor 1202 (e.g., a central processing unit (CPU), a graphics processing unit (GPU) or both, processor cores, compute nodes, etc.), a main memory 1204 and a static memory 1206, which communicate with each other via a link 1208 (e.g., bus). The computer system 1200 may further include a video display unit 1210, an alphanumeric input device 1212 (e.g., a keyboard), and a user interface (UI) navigation device 1214 (e.g., a mouse). In one embodiment, the video display unit 1210, input device 1212 and UI navigation device 1214 are incorporated into a touch screen display. The computer system 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, or other sensor.

The storage device 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the computer system 1200, with the main memory 1204, static memory 1206, and the processor 1202 also constituting machine-readable media.

While the machine-readable medium 1222 is illustrated in an example embodiment to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Example 1 is a method comprising: presenting a user interface on a display device of a computing device, the user interface including: a search query input element; a plurality of graph type options; a graph level selection element; and a graph presentation area; receiving a search query inputted into the search query input element, the search query identifying a concept object in an ontology; retrieving data associated with the concept object from a graph database based on selections made in the graph type options and the graph level selection element, the data including a set of result objects related to the concept object; and rendering a hierarchical graph in the graph presentation area, the hierarchical graph illustrating the set of result objects and the concept object as interactive nodes.

In Example 2, the subject matter of Example 1 optionally includes wherein the set of results objects are directly related concept objects to the concept object when the graph type is a concept taxonomy graph.

In Example 3, the subject matter of any one or more of Examples 1-2 optionally include wherein the set of results objects are semantically related concept objects to the concept object when the graph type is a concept graph.

In Example 4, the subject matter of Example 3 optionally includes wherein the hierarchical graph includes vertices between the set of interactive nodes and wherein the vertices are labeled according to their respective sematic relationships.

In Example 5, the subject matter of any one or more of Examples 1-4 optionally include wherein the level selection determines a graph distance threshold from the concept object to include in the set of results objects.

In Example 6, the subject matter of any one or more of Examples 1-5 optionally include receiving an interaction with a node of the set of interactive nodes; based on the interaction, presenting a set of graph types for the node; receiving a graph selection from the set of graph types; using a search concept identified by the selection to render a new hierarchical graph in the graph presentation area according to the graph selection.

In Example 7, the subject matter of any one or more of Examples 1-6 optionally include receiving an interaction with a node of the set of interactive nodes; based on the interaction, presenting a definition of the node in the graph presentation area.

In Example 8, the subject matter of any one or more of Examples 1-7 optionally include wherein the set of results objects are data assets related to the concept object when the graph type is a data assets graph.

In Example 9, the subject matter of Example 8 optionally includes wherein the data assets include relational database columns that store data associated with the concept object.

In Example 10, the subject matter of Example 9 optionally includes the method comprising: accessing a mapping between the concept object and data assets to identify the set of interactive nodes to include in the hierarchical graph.

Example 11 is a method comprising: presenting a user interface on a display device of a computing device, the user interface including: a search query input element; and a data store visualization presentation area; receiving a search query inputted into the search query input element, the search query identifying a data store, the data store including a table with a set of columns with associated column identifiers; establishing a set of concept objects by accessing, for each respective column identifier of the column identifiers, a concept object in an ontology associated with the respective column identifier; generating a visualization of relationships between the data store and the set of concept objects; and presenting the visualization in the data store visualization area.

In Example 12, the subject matter of Example 11 optionally includes wherein generating the visualization of the relationships includes generating a hierarchical graph with a plurality of nodes, the hierarchical graph including a node for the table and a node for each column of the set of columns.

In Example 13, the subject matter of Example 12 optionally includes wherein a label for a concept object of the set of concept objects is presented as adjacent to the concepts object's associated column.

In Example 14, the subject matter of any one or more of Examples 12-13 optionally include wherein the node of the table is depicted as a first icon type and the node for each column is depicted as a second icon type, the first icon type being different than the second icon type.

In Example 15, the subject matter of any one or more of Examples 12-14 optionally include receiving an interaction with a node of a column of the set of columns; based on the interaction, retrieving profile information for the column, the profile information including the column's identifier and data type.

In Example 16, the subject matter of any one or more of Examples 12-15 optionally include receiving an interaction with the node for the table; based on the interaction, retrieving statistical information for the table, the statistical information including a total number of records for the table.

In Example 17, the subject matter of any one or more of Examples 12-16 optionally include wherein the hierarchical graph further includes a node for a schema associated with the table and a node for a database associated with the table.

Example 18 is a method comprising: presenting a user interface on a display device of a computing device, the user interface including: a search query input element; a database visualization presentation area; receiving a search query inputted into the search query input element, the search query identifying a database; for each table pair of the database, identifying common column identifiers available for a join query; generating a visualization of the tables in the database, the visualization including: a set of icons, each icon in the set of icons representing a different table of the database, wherein a size of a respective icon in the set of icons is relative to a total number of rows in the respective table compared to a total number of rows across all the tables in the database; and a set of connections between the set of icons, each connection in the set of connections corresponding to a column identifier in the identified column identifiers; and presenting the visualization of the database in the database visualization presentation area.

In Example 19, the subject matter of Example 18 optionally includes receiving an interaction with a first icon of the set of icons; in response to the interaction, presenting statistics for a table represented by the first icon.

In Example 20, the subject matter of Example 19 optionally includes wherein the statistics include a breakdown of data stored in the table according to a set of categories.

In Example 21, the subject matter of Example 20 optionally includes determining the categorical breakdown for the first table by, for each respective column identifier in the table: retrieving a concept object for the respective column identifier; and retrieving a category for the concept object; and calculating the percentage of data items in the table for the category.

In Example 22, the subject matter of any one or more of Examples 19-21 optionally include wherein the statistics include a number of rows in the table.

In Example 23, the subject matter of any one or more of Examples 19-22 optionally include wherein the connections are labeled according to concept objects in a semantic ontology correlated with a column identifier.

In Example 24, the subject matter of any one or more of Examples 18-23 optionally include wherein each of the icons of the set of icons is formatted in a different color.

Example 25 is a method comprising: presenting a user interface on a display device of a computing device, the user interface including: a search query input element; and a chart presentation area; receiving a search query inputted into the search query input element, the search query associated with a data store; querying the data store to obtain counts of each unique value of a semantic property within the data store; generating a graphical representation of the counts, the graphical representation segmented into a set of primary segments, one primary segment for each unique value of the semantic property; and presenting the graphical representation of the counts in the chart presentation area.

In Example 26, the subject matter of Example 25 optionally includes wherein a size of a primary segment for a unique value of the semantic property within the graphical representation is relative to a sum of the counts of each unique value of the semantic property.

In Example 27, the subject matter of any one or more of Examples 25-26 optionally include wherein each respective primary segment is segmented into a respective set of secondary segments.

In Example 28, the subject matter of Example 27 optionally includes wherein each primary segment is presented using a different visual identifier of a set of visual identifier classes.

In Example 29, the subject matter of any one or more of Examples 27-28 optionally include wherein the set of visual identifier classes is a set of colors, and each primary segment is assigned a color.

In Example 30, the subject matter of Example 29 optionally includes wherein each secondary segment within a primary segment is presented in a different shade of the primary segment's assigned color.

In Example 31, the subject matter of any one or more of Examples 27-30 optionally include wherein each respective secondary segment is associated with a respective concept object in an ontology; and wherein the method further comprises: querying the data store to obtain a count of entries within the data store associated with the respective concept object, wherein a size of the respective secondary segment within the graphical representation is relative to a sum of the counts of each unique value of the semantic property.

In Example 32, the subject matter of Example 31 optionally includes receiving an input associated with a secondary segment; and in response to the input, presenting a concept label associated with the secondary segment.

In Example 33, the subject matter of any one or more of Examples 31-32 optionally include wherein the input is a hover over input on the secondary segment within the graphical representation.

In Example 34, the subject matter of any one or more of Examples 25-33 optionally include wherein the graphical representation is a geometric shape.

In Example 35, the subject matter of any one or more of Examples 25-34 optionally include wherein the semantic property is a classification level property of a concept object within an ontology.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
presenting a user interface on a display device of a computing device, the user interface including:
  a search query input element;
  a graph type selection portion identifying a plurality of a graph types including a concept graph type and a data asset graph type;
  a plurality of graph visualization options;
  a graph level selection element; and
  a graph presentation area, the graph presentation area configured to display a type of graph according to a current selection in the graph type selection portion and input of the search query input element;
receiving a search query inputted into the search query input element, the search query identifying a concept object in a semantic ontology as stored in a graph database, the semantic ontology identifying tuples formatted with a subject, predicate, and object;
receiving a selection of the concept graph type in the graph type selection portion;
in response to receiving the selection, retrieving data associated with the concept object from the graph database based on the received selection and a selection made in the graph level selection element, the data including a set of result objects related to the concept object, the set of results objects being semantically related concept objects to the concept object; and
rendering a hierarchical graph in the graph presentation area, the hierarchical graph illustrating the set of result objects and the concept object as interactive nodes, wherein the hierarchical graph includes edges between the set of interactive nodes and wherein the edges are textually labeled according to their respective sematic relationships based on a predicate portion of a tuple stored in the graph database.

2. The method of claim 1, wherein the level selection determines a graph distance threshold from the concept object to include in the set of results objects.

3. The method of claim 1, further comprising:
receiving an interaction with a node of the set of interactive nodes;
based on the interaction, presenting a set of graph types for the node;
receiving a data assets type graph selection from the set of graph types; and
using a search concept identified by the selection to render a new data asset graph in the graph presentation area, the data asset graph including a database entity, a table entity, a column entity, and an edge connecting the column entity and table entity.

4. The method of claim 1, further comprising:
receiving an interaction with a node of the set of interactive nodes; and
based on the interaction, presenting a definition of the node in the graph presentation area.

5. A non-transitory computer readable medium comprising instructions, which when executed by at least one processor, configure the at least one processor to perform operations comprising:
presenting a user interface on a display device of a computing device, the user interface including:
  a search query input element;
  a graph type selection portion identifying a plurality of a graph types including a concept graph type and a data asset graph type;
  a plurality of graph visualization options;
  a plurality of graph type options;
  a graph level selection element; and
  a graph presentation area, the graph presentation area configured to display a type of graph according to a current selection in the graph type selection portion and input of the search query input element;
receiving a search query inputted into the search query input element, the search query identifying a concept object in a semantic ontology as stored in a graph database, the semantic ontology identifying tuples formatted with a subject, predicate, and object;
receiving a selection of the concept graph type in the graph type selection portion;
in response to receiving the selection, retrieving data associated with the concept object from the graph database based on the received selection and a selection made in the graph level selection element, the data including a set of result objects related to the concept object, the set of results objects being semantically related concept objects to the concept object; and
rendering a hierarchical graph in the graph presentation area, the hierarchical graph illustrating the set of result objects and the concept object as interactive nodes, wherein the hierarchical graph includes edges between the set of interactive nodes and wherein the edges are textually labeled according to their respective sematic relationships based on a predicate portion of a tuple stored in the graph database.

6. The computer readable medium of claim 5, wherein the level selection determines a graph distance threshold from the concept object to include in the set of results objects.

7. The computer readable medium of claim 5, the operations further comprising:
receiving an interaction with a node of the set of interactive nodes;
based on the interaction, presenting a set of graph types for the node;
receiving a data assets type graph selection from the set of graph types; and
using a search concept identified by the selection to render a new data asset graph in the graph presentation area, the data asset graph including a database entity, a table entity, a column entity, and an edge connecting the column entity and table entity.

8. A system comprising:
at least one processor;
a storage device comprising instructions, which when executed by the at least one processor, configure the at least one processor to perform operations comprising:
presenting a user interface on a display device of a computing device, the user interface including:
  a search query input element;
  a graph type selection portion identifying a plurality of a graph types including a concept graph type and a data asset graph type;
  a plurality of graph visualization options;
  a graph level selection element; and
  a graph presentation area, the graph presentation area configured to display a type of graph according to a current selection in the graph type selection portion and input of the search query input element;
receiving a search query inputted into the search query input element, the search query identifying a concept object in a semantic ontology as stored in a graph database, the semantic ontology identifying tuples formatted with a subject, predicate, and object;

receiving a selection of the concept graph type in the graph type selection portion;

in response to receiving the selection, retrieving data associated with the concept object from the graph database based on the received selection and a selection made in the graph level selection element, the data including a set of result objects related to the concept object, the set of results objects being semantically related concept objects to the concept object; and rendering a hierarchical graph in the graph presentation area, the hierarchical graph illustrating the set of result objects and the concept object as interactive nodes, wherein the hierarchical graph includes edges between the set of interactive nodes and wherein the edges are textually labeled according to their respective sematic relationships based on a predicate portion of a tuple stored in the graph database.

\* \* \* \* \*